(12) United States Patent
Qureshi et al.

(10) Patent No.: US 12,288,106 B2
(45) Date of Patent: Apr. 29, 2025

(54) MODELING CLOUD INEFFICIENCIES USING DOMAIN-SPECIFIC TEMPLATES

(71) Applicant: Cresance Inc., Mountain View, CA (US)

(72) Inventors: Zuhier S. Qureshi, Mountain View, CA (US); Haamid Ali, Mountain View, CA (US)

(73) Assignee: Cresance Inc., Mountain View, CA (US)

( * ) Notice: Subject to any disclaimer, the term of this patent is extended or adjusted under 35 U.S.C. 154(b) by 0 days.

(21) Appl. No.: 17/843,918

(22) Filed: Jun. 17, 2022

(65) Prior Publication Data

US 2023/0145025 A1   May 11, 2023

Related U.S. Application Data

(63) Continuation of application No. PCT/US2020/066421, filed on Dec. 21, 2020.

(60) Provisional application No. 62/955,649, filed on Dec. 31, 2019, provisional application No. 62/955,636, filed on Dec. 31, 2019, provisional application No. 62/955,643, filed on Dec. 31, 2019, provisional application No. 62/955,626, filed on Dec. 31, 2019, (Continued)

(51) Int. Cl.
    *G06F 9/50*    (2006.01)
(52) U.S. Cl.
    CPC .......... *G06F 9/5094* (2013.01); *G06F 9/5072* (2013.01); *G06F 2209/5019* (2013.01)
(58) Field of Classification Search
    CPC .................................................. G06F 9/5094
    See application file for complete search history.

(56) References Cited

U.S. PATENT DOCUMENTS 6,978,257 B1 * 12/2005 Halbout ................. G06Q 30/06
                                                      705/400
9,274,849 B1   3/2016 Estes et al.
(Continued)

OTHER PUBLICATIONS

Cresance Inc., PCT/US2020/066421, International Search Report and Written Opinion dated Apr. 23, 2021, 16 pgs.
(Continued)

*Primary Examiner* — Charlie Sun
(74) *Attorney, Agent, or Firm* — Morgan, Lewis & Bockius LLP

(57) ABSTRACT

Systems and methods are provided for modeling cloud inefficiencies. The method includes connecting to services executing on cloud computing systems via APIs. The method also includes determining types of services for the services based on usage and performance data obtained from the APIs. The method also includes determining states of computing resources corresponding to the services based on the types of services and performance parameters obtained from the APIs. The method also includes cataloging cloud inefficiencies of the services using cloud wastage templates based on the states of the computing resources. The cloud wastage templates follow conventions of a domain specific language (DSL) that describe the one or more cloud computing systems. The templates can be written by a human, and/or can be generated, read, and/or manipulated by machines (e.g., neural networks). The templates use identifiers that help when it is difficult to understand or troubleshoot neural network generated output.

20 Claims, 20 Drawing Sheets

Related U.S. Application Data provisional application No. 62/955,631, filed on Dec. 31, 2019, provisional application No. 62/952,025, filed on Dec. 20, 2019, provisional application No. 62/952,041, filed on Dec. 20, 2019.

(56) References Cited

U.S. PATENT DOCUMENTS

| | | | |
|---|---|---|---|
| 2014/0173105 A1* | 6/2014 | Sarfati | H04L 67/535 709/224 |
| 2018/0329757 A1 | 11/2018 | Patgar et al. | |
| 2019/0007410 A1 | 1/2019 | Hu et al. | |
| 2019/0187877 A1 | 6/2019 | Scattolin et al. | |
| 2019/0340029 A1 | 11/2019 | Ganteaume | |

OTHER PUBLICATIONS

Sledziewski, K., Bordbar, B., & Anane, R. (Apr. 2010). A DSL-based approach to software development and deployment on cloud. In 2010 24th IEEE International Conference on Advanced Information Networking and Applications (pp. 414-421). IEEE, 8 pgs.

Cresance Inc., PCT/US2020/066421, International Preliminary Report on Patentability dated May 17, 2022, 8 pgs.

* cited by examiner

Cloud Efficiency Data 226

- Cloud Efficiency API(s) 262
- Cloud State(s) 264
- Cloud Wastage Template(s) 266
- Cloud Signature Identifier(s) 268
- Telemetry Log and Performance Data 270
- Disaggregation Data 272
- Feature Vectors 274
- Confusion Matrices 276
- Cloud State Simulations and/or Cloud Efficiency Scores 278
- Simulation Visual Specifications 280
- Cloud Probabilistic Models 282
- Cloud Provider Data (E.g., Dynamic Real-time Pricing) 284
- Cloud Efficiency Agent Policies 286
- ⋮

Figure 2B

MODELING CLOUD INEFFICIENCIES USING DOMAIN-SPECIFIC TEMPLATES

RELATED APPLICATIONS

This Application is a bypass continuation of PCT Patent Application Serial No. PCT/US2020/066421, filed on Dec. 21, 2020, which claims the benefit of and priority to: (i) U.S. Provisional Patent Application No. 62/952,025, filed Dec. 20, 2019, entitled "Modeling Cloud Inefficiencies Using Domain-Specific Templates," (ii) U.S. Provisional Patent Application No. 62/952,041, filed Dec. 20, 2019, entitled "Identifying Cloud Inefficiencies Using Disaggregation and Machine Learning," (iii) U.S. Provisional Patent Application No. 62/955,626, filed Dec. 31, 2019, entitled "Simulating Cloud Configurations for Improving Cloud Efficiency," (iv) U.S. Provisional Patent Application No. 62/955,631, filed Dec. 31, 2019, entitled "Using Reinforcement Learning And Game Theory to Improve Cloud Efficiency," (v) U.S. Provisional Patent Application No. 62/955,636, filed Dec. 31, 2019, entitled "Systems And Methods for Monitoring And Optimizing Cloud Efficiency," (vi) U.S. Provisional Patent Application No. 62/955,643, filed Dec. 31, 2019, entitled "Orchestration and Management of Cloud Services," and (vii) U.S. Provisional Patent Application No. 62/955,649, filed Dec. 31, 2019, entitled "System And Method for Computing Normalized Cloud Efficiency Scores for Benchmarking," each of which is incorporated by reference herein in its entirety.

TECHNICAL FIELD

The disclosed implementations relate generally to cloud computing, and more specifically to systems, methods, and user interfaces for improving cloud efficiency.

BACKGROUND

Enterprise companies are increasingly adopting cloud technologies to reduce operational costs. Because cloud infrastructure is usually remote (e.g., uses external or third-party data centers), inefficiencies are not apparent to the enterprise user. Enterprise customers are oblivious to the source of inefficiencies and lack visibility to address the inefficiencies. The growing number of cloud providers (and cloud services) complicates the problem even more. Optimizing for one cloud provider may not be the best option for another provider or service. There is also a lack of industry standard or consensus on how cloud efficiency should be measured. Enterprise companies need tools and techniques, such as intelligent visualizations, that help quickly identify problems with cloud deployments and/or solutions to address the inefficiencies. Cloud solutions should scale as technology advances. For example, although human operators may initially identify and fix problems, such domain knowledge and expertise should be documented, and/or automated. Existing systems also do not automatically mediate cloud services across cloud vendors, and fail to provide cost-effective cloud solutions.

SUMMARY

Accordingly, there is a need for methods, systems and/or interfaces that address at least some of the deficiencies identified above. Such systems, methods, and interfaces model/identify cloud inefficiencies, and optionally provide the enterprise companies with alternative cloud solutions and strategies to reduce the inefficiencies. Some implementations use normalized cloud efficiency scores (e.g., industry standard scores) for optimizing cloud resources for enterprise companies. Some implementations mediate cloud deployments by automatically mapping enterprise workloads to cloud services. Some implementations use domain specific templates to model cloud wastage patterns, and enable automation. Some implementations identify software running on cloud systems using disaggregation algorithms (e.g., electrical disaggregation technologies) and machine learning techniques, and use that knowledge to solve cloud inefficiencies. Some implementations find solutions to cloud inefficiencies by applying reinforcement learning and game theory.

(A1) In accordance with some implementations, a system is provided for improving cloud efficiency. The system includes one or more cloud efficiency analyzers coupled to one or more services executing on one or more cloud computing systems. Each cloud efficiency analyzer includes one or more cloud services data aggregators configured to obtain (i) performance data from the one or more services using one or more APIs and (ii) telemetric log data from the one or more cloud computing systems. Each cloud efficiency analyzer also includes one or more trained machine learning classifiers and one or more disaggregation modules coupled to the one or more cloud services data aggregators. The one or more trained machine learning classifiers are configured to determine one or more cloud states of one or more computing resources of the one or more cloud computing systems used by the one or more services. Each cloud efficiency analyzer also includes one or more cloud inefficiency identifiers coupled to the one or more trained machine learning classifiers and the one or more disaggregation modules. The one or more cloud inefficiency identifiers are configured to identify cloud inefficiencies in the one or more services using one or more cloud signature identifiers based on one or more cloud wastage templates for the one or more cloud states. The system also includes one or more cloud efficiency managers (e.g., one or more cloud efficiency recommendation modules that recommend changes to configuration without actually reconfiguring the services) coupled to the one or more cloud efficiency analyzers. Each cloud efficiency manager includes one or more cloud configuration determination modules configured to determine one or more candidate configurations of the one or more computing resources based on one or more cloud probabilistic models for characterizing cloud efficiency and the one or more cloud states. The one or more candidate configurations improve the efficiency of the one or more services relative to an initial configuration of the one or more computing resources. Each cloud efficiency manager also includes one or more cloud reconfiguration modules are configured to apply changes to the one or more services according to the one or more candidate configurations.

(A2) In some implementations of (A1), the system further includes one or more cloud wastage template repositories coupled to the one or more cloud efficiency analyzers, configured to store the one or more cloud wastage templates. The one or more cloud inefficiency identifiers are further configured to retrieve the one or more cloud wastage templates from the one or more cloud wastage template repositories.

(A3) In some implementations of any of (A1)-(A2), the system further includes one or more cloud signature identifier repositories coupled to the one or more cloud efficiency analyzers, configured to store the one or more cloud signature identifiers. The one or more cloud inefficiency identifiers are further configured to retrieve the one or more cloud signature identifiers from the one or more cloud signature identifier repositories.

(A4) In some implementations of any of (A1)-(A3), the system further includes one or more cloud states repositories coupled to the one or more cloud efficiency analyzers and the one or more cloud efficiency managers, configured to store the one or more cloud states. The one or more trained machine learning classifiers and the one or more disaggregation modules are further configured to store the one or more cloud states to the one or more cloud states repositories, and the one or more cloud configuration determination modules are further configured to retrieve the one or more cloud states from the one or more cloud states repositories.

(A5) In some implementations of any of (A1)-(A4), the system further includes one or more cloud probabilistic model repositories coupled to the one or more cloud efficiency managers, configured to store the one or more cloud probabilistic models. The one or more cloud configuration determination modules are further configured to retrieve the one or more cloud probabilistic models from the one or more cloud probabilistic model repositories.

(A6) In some implementations of any of (A1)-(A5), the system further includes one or more cloud state simulation modules coupled to the one or more cloud efficiency managers, configured to simulate changes to the one or more computing resources that improve efficiency of the one or more services based on the initial configuration. The one or more cloud configuration determination modules are further configured to determine the one or more candidate configurations by applying the one or more cloud probabilistic models on one or more output of the one or more cloud state simulation modules.

(A7) In some implementations of any of (A1)-(A6), the system further includes one or more cloud efficiency agent modules coupled to the one or more cloud efficiency managers, configured to apply cooperative game theory and reinforcement learning to determine the one or more candidate configurations of the one or more computing resources based on the one or more cloud probabilistic models. The one or more cloud configuration determination modules are further configured to retrieve the one or more candidate configurations from the one or more cloud efficiency agent modules.

(A8) In some implementations of (A7), the system further includes one or more cloud efficiency policy repositories coupled to the one or more cloud efficiency agent modules, configured to store one or more cloud policies. The one or more cloud efficiency agent modules are further configured to retrieve the one or more cloud policies from the one or more cloud policy repositories and determine the one or more candidate configurations of the one or more computing resources based on the one or more cloud probabilistic models and the one or more cloud policies.

(B1) In accordance with some implementations, a method is provided for improving cloud efficiency. The method includes obtaining (i) performance data from one or more services executing on one or more cloud computing systems, using one or more APIs, and (ii) telemetric log data from the one or more cloud computing systems. The method also includes determining one or more cloud states of one or more computing resources of the one or more cloud computing systems used by the one or more services. The method also includes identifying cloud inefficiencies in the one or more services using one or more cloud signature identifiers based on one or more cloud wastage templates for the one or more cloud states. The method also includes determining one or more candidate configurations of the one or more computing resources based on one or more cloud probabilistic models for characterizing cloud efficiency and the one or more cloud states, the one or more candidate configurations improving the efficiency of the one or more services relative to an initial configuration of the one or more computing resources. The method also includes applying changes to the one or more services according to the one or more candidate configurations.

(B2) In some implementations of (B1), the method further includes: storing the one or more cloud wastage templates to one or more cloud wastage template repositories; and retrieving the one or more cloud wastage templates from the one or more cloud wastage template repositories.

(B3) In some implementations of any of (B1)-(B2), the method further includes: storing the one or more cloud signature identifiers to one or more cloud signature identifier repositories; and retrieving the one or more cloud signature identifiers from the one or more cloud wastage template repositories.

(B4) In some implementations of any of (B1)-(B3), the method further includes: storing the one or more cloud states to one or more cloud states repositories; and retrieving the one or more cloud states from the one or more cloud states repositories.

(B5) In some implementations of any of (B1)-(B4), the method further includes: storing the one or more cloud probabilistic models to one or more cloud probabilistic model repositories; and retrieving the one or more cloud probabilistic models from the one or more cloud probabilistic model repositories.

(B6) In some implementations of any of (B1)-(B5), the method further includes: simulating changes to the one or more computing resources that improve efficiency of the one or more services based on the initial configuration; and determining the one or more candidate configurations by applying the one or more cloud probabilistic models on one or more output of the one or more cloud state simulation modules.

(B7) In some implementations of any of (B1)-(B6), the method further includes: applying cooperative game theory and reinforcement learning to determine the one or more candidate configurations of the one or more computing resources based on the one or more cloud probabilistic models; and retrieving the one or more candidate configurations from the one or more cloud efficiency agent modules.

(B8) In some implementations of (B7), the method further includes: storing one or more cloud policies to one or more cloud efficiency policy repositories; retrieving the one or more cloud policies from the one or more cloud policy repositories; and determining the one or more candidate configurations of the one or more computing resources based on the one or more cloud probabilistic models and the one or more cloud policies.

(C1) In another aspect, in accordance with some implementations, a method is provided for modeling cloud inefficiencies. The method is performed at a computer having one or more processors, and memory storing one or more programs configured for execution by the one or more processors. The method includes connecting to one or more services, distinct from the server, executing on the one or more cloud computing systems (e.g., public cloud systems, such as AWS, GCS, Azure, private cloud systems, or hybrid cloud systems) via one or more APIs (e.g., APIs designed to gather data to identify cloud inefficiencies, and exclude or not collect data related to personally identifiable information (PII), customer lists, and similar data, unrelated to the purpose of identifying cloud inefficiencies). The method also includes determining types of services (e.g., IaaS, PaaS, SaaS; some implementations also determine service types, such as Big Query, and/or application service class, such as 10-T, E-Commerce) for the one or more services based on usage and performance data obtained from the one or more APIs. The method also includes determining states of one or more computing resources corresponding to the one or more services based on the types of services and performance parameters obtained from the one or more APIs. The method also includes cataloging (e.g., identifying and/or modeling) cloud inefficiencies of the one or more services using one or more cloud wastage templates based on the states of one or more computing resources. The one or more cloud wastage templates follow conventions (e.g., written/generated according to grammar rules) of a domain specific language (DSL) that describe the one or more cloud computing systems. The DSL-based templates can be written by a human or generated by machines (e.g., neural networks). The DSL templates use labels for names when it is difficult to label neural network generated output. The DSL templates are machine readable so can be easily read and manipulated.

(C2) In some implementations of (C1), the DSL includes a persistence mapping, and the method further includes storing the cloud wastage templates to a repository, according to the persistence mapping. In some implementations, the method further includes retrieving the cloud wastage templates from the repository, prior to cataloging the cloud inefficiencies.

(C3) In some implementations of any of (C1)-(C2), the one or more cloud wastage templates are generated by a neural network trained to identify cloud inefficiencies of the one or more services.

(C4) In some implementations of any of (C1)-(C3), the DSL includes grammar rules for describing services and metrics of the one or more cloud computing systems.

(C5) In some implementations of any of (C1)-(C4), the one or more cloud wastage templates include one or more predetermined wastage patterns (e.g., typical wastage patterns identified by a human) of the one or more cloud computing systems.

(C6) In some implementations of (C5), the one or more cloud computing systems facilitate Infrastructure-as-a-Service (IaaS), and the one or more predetermined wastage patterns include a comatose state (e.g., machine unused for a predetermined period of time, network that shows no traffic) of one or more servers of the one or more cloud computing systems. In some implementations, the one or more cloud computing systems facilitate Infrastructure-as-a-Service (IaaS) (e.g., VMs, networking resources, storage resources), and the one or more predetermined wastage patterns include a hermit state (e.g., intermittent use or a predetermined pattern of use) of one or more servers of the one or more cloud computing systems. In some implementations, the one or more cloud computing systems facilitate Infrastructure-as-a-Service (IaaS), and the one or more predetermined wastage patterns include a misfit state (e.g., over-subscription) of one or more servers of the one or more cloud computing systems.

(C7) In some implementations of (C5), the one or more cloud computing systems facilitate Platform-as-a-Service (PaaS) (e.g., database interfaces, application servers), and the method further includes identifying one or more workloads that improve efficiency of the one or more services.

(C8) In some implementations of (C5), the one or more cloud computing systems facilitate Software-as-a-Service (SaaS) (e.g., Salesforce, Office 365), and the method further includes identifying one or more software licenses that are unused for a predetermined period of time.

(D1) In another aspect, in accordance with some implementations, a method is provided for identifying cloud inefficiencies using disaggregation algorithms and machine learning. The method is performed at a server having one or more processors, and memory storing one or more programs configured for execution by the one or more processors. The method includes obtaining telemetric log data (sometimes called metrics data) for one or more services, distinct from the server, executing on one or more cloud computing systems. The method also includes determining (or generating) one or more disaggregation data (e.g., temporal data, software or service types) for the one or more services based on the telemetric log data by applying one or more disaggregation algorithms. The method also includes forming feature vectors based on the telemetric log data (in addition to features extracted from raw data corresponding to application or system level data collected from the one or more cloud computing systems) and one or more cloud states of the cloud computing systems. The method also includes identifying software or service types and one or more cloud wastage templates by inputting the feature vectors to trained one or more classifiers (e.g., convolutional neural networks). The cloud wastage templates follow conventions (e.g., written/generated according to grammar rules) of a domain specific language (DSL) that describe the one or more cloud computing systems. Each classifier is a machine-learning model trained to identify cloud wastages for predetermined states (e.g., software stacks) of the one or more cloud computing systems. The method also includes cataloging cloud inefficiencies using the one or more cloud wastage templates based on the one or more cloud states. In some implementations, the one or more cloud wastage templates are derived based on output of APIs used to connect to the one or more services.

(D2) In some implementations of (D1), the one or more disaggregation algorithms include an energy disaggregation algorithm that parses energy usage of the one or more cloud computing systems by analyzing the telemetric log data (e.g., by analyzing electricity consumption data derived from the log data).

(D3) In some implementations of any of (D1)-(D2), the one or more disaggregation data includes temporal data (e.g., which service was operational during different time periods) for the one or more services.

(D4) In some implementations of any of (D1)-(D3), the one or more disaggregation data includes types of service for the one or more services.

(D5) In some implementations of any of (D1)-(D4), identifying the software or service types includes determining a confidence level (e.g., using a confusion matrix) that the one or more services include one more software services or one or more workloads during one or more predetermined periods of time.

(D6) In some implementations of any of (D1)-(D5), the one or more classifiers include one or more convolutional neural networks (CNNs) trained to classify software stacks based on software fingerprints in the telemetric log data.

(D7) In some implementations of any of (D1)-(D6), each classifier of the one or more classifiers is trained to identify (or identify execution of) a respective software.

(D8) In some implementations of any of (D1)-(D7), the telemetric log data includes network usage data, disk usage data, and CPU resource usage data.

(D9) In some implementations of any of (D1)-(D8), the method further includes generating one or more reports including one or more time charts that show execution of software stacks or workloads for a predetermined period of time, the software stacks or workloads corresponding to the one or more cloud states.

(D10) In some implementations of (D1)-(D9), the one or more cloud states are represented according to grammar rules of a domain specific language (DSL) that describe the one or more cloud computing systems.

(D11) In some implementations of (D10), the grammar rules include one or more rules for expressing names of software stacks, names of classifiers, and confidence levels. In some implementations, the one or more cloud states are predetermined cloud wastage templates (CWTs).

(E1) In another aspect, a method is provided for simulating cloud configurations, in accordance with some implementations. The method is performed at a server having a display, one or more processors, and memory storing one or more programs configured for execution by the one or more processors. The method includes obtaining a catalog of cloud inefficiencies of one or more services for an enterprise customer. The one or more services (e.g., servers, storage, databases, networking, software, analytics) execute on (or are provisioned on) the one or more cloud computing systems. The method also includes determining an initial configuration of one or more computing resources (e.g., CPU cores, memory, network storage) of the one or more cloud computing systems based on the catalog of cloud inefficiencies. The method also includes generating a first one or more configurations of the one or more computing resources by simulating changes to the one or more computing resources that improve efficiency of the one or more cloud computing systems based on the initial configuration. The method also includes generating and displaying, on the display, one or more visualizations of the first one or more configurations of the one or more cloud computing systems. In some implementations, the one or more visualizations include at least information related to changes to the one or more computing resources.

(E2) In some implementations of (E1), the initial configuration includes one or more initial states of the one or more computing resources, and simulating changes to the one or more computing resources includes simulating changes to the one or more initial states for improving efficiency of the one or more cloud computing systems.

(E3) In some implementations of (E2), the method further includes generating and displaying, on the display, a visualization of the initial configuration of the one or more cloud computing systems, the visualization including information related to one or more initial states of the one or more computing resources.

(E4) In some implementations of any of (E1)-(E3), generating the first one or more configurations includes: computing an initial efficiency score (or metric) for the one or more cloud computing systems based on (i) the initial configuration and (ii) a predetermined model for characterizing cloud efficiency; and simulating changes to the one or more computing resources to achieve an improved efficiency score according to (i) one or more resource constraints, (ii) one or more policy constraints, and (iii) the predetermined model for characterizing cloud efficiency.

(E5) In some implementations of (E4), the predetermined model includes one or more time probabilistic models for predicting a change to one or more initial states of the one or more computing resources.

(E6) In some implementations of (E5), the method further includes providing one or more affordances to select the one or more resource constraints, and obtaining the one or more resource constraints by detecting selection of the one or more affordances.

(E7) In some implementations of (E4), the method further includes validating the one or more resource constraints and substituting predetermined valid resource constraint values for invalid resource constraints.

(E8) In some implementations of any of (E1)-(E7), the method further includes generating a second one or more configurations of the one or more computing resources by simulating changes to the one or more computing resources that improve efficiency of the one or more cloud computing systems based on the first one or more configurations. The method also includes generating and displaying, on the display, a second one or more visualizations of the second one or more configurations of the one or more cloud computing systems, the second one or more visualizations including information related to changes to the one or more computing resources.

(E9) In some implementations of (E8), the method further includes displaying the second visualizations of the second one or more configurations while concurrently displaying the visualization of the first one or more configurations. The method also includes detecting a selection of the visualization of the first one or more configurations, and, in response to detecting the selection of the visualization of the first one or more configurations, switching from displaying the second one or more visualizations to displaying the visualization of the first one or more configurations.

(E10) In some implementations of any of (E1)-(E9), the method further includes generating a visual simulation (e.g., showing a morphing) of the change from the initial configuration (e.g., an inefficient state) to the first one or more configurations (e.g., efficient states).

(F1) In another aspect, in accordance with some implementations, a method is provided for improving cloud efficiency using reinforcement learning and game theory. The method is performed at a server having one or more processors, and memory storing one or more programs configured for execution by the one or more processors. The method includes obtaining a catalog of cloud inefficiencies (e.g., recipes for detecting cloud inefficiencies, samples of signals determinative of cloud inefficiencies) of one or more cloud computing systems used to execute one or more services for an enterprise customer. The method also includes computing an initial configuration of one or more computing resources of the one or more cloud computing systems based on the catalog of cloud inefficiencies. The method also includes obtaining one or more resource constraints corresponding to the one or more computing resources and one or more policy constraints corresponding to the one or more cloud computing systems. The method also includes concurrently generating, using a plurality of agents, a plurality of expected configurations of the one or more computing resources. Each agent identifies changes to the initial configuration to obtain at least one expected configuration that reduces inefficiencies in the one or more services based on the one or more resource constraints and the one or more policy constraints (e.g., cost/$, response times, priorities, such as what data needs to be replicated). Each agent is rewarded based on a predetermined probabilistic model for characterizing cloud efficiency. The method also includes determining a candidate configuration of the one or more cloud computing systems from the plurality of expected configurations. The method also includes generating and displaying, on the display, a visualization of the candidate configuration of the one or more cloud computing systems, the visualization including information related to the one or more computing resources (e.g., visual marks that indicate operational efficiency).

(F2) In some implementations of (F1), the plurality of agents applies game theory to improve efficiency of the one or more services. (e.g., agents apply cooperative game theory based on policy constraints).

(F3) In some implementations of any of (F1)-(F2), the plurality of agents includes at least one agent that uses reinforcement learning to improve efficiency of the one or more services.

(F4) In some implementations of any of (F1)-(F3), reducing inefficiencies in the one or more services includes reducing an overall cost of operating the one or more services.

(F5) In some implementations of any of (F1)-(F4), the method further includes obtaining one or more configuration parameters and using the one or more configuration parameters to orchestrate operations of the plurality of agents.

(F6) In some implementations of any of (F1)-(F5), the method further includes providing one or more affordances to select the one or more policy constraints, and obtaining the one or more policy constraints by detecting selection of the one or more affordances.

(G1) In another aspect, in accordance with some implementations, a method is provided for efficient execution of workloads on cloud systems. The method is performed at a server having one or more processors, and memory storing one or more programs configured for execution by the one or more processors. The method includes obtaining one or more workloads to execute on a plurality of cloud computing systems. Each workload has a plurality of execution characteristics (e.g., memory or compute requirements, such as scalar, floating-point operations), and each cloud computing system has distinct operational capabilities (e.g., security, performance, scalability). The method also includes determining, based on a cost-benefit analysis, a mapping of the plurality of execution characteristics to the operational capabilities of the plurality of cloud computing systems. The method also includes providing one or more APIs (e.g., APIs other than those provided by public cloud service providers) to retrieve results for the one or more workloads. The method also includes selecting, based on the mapping, a first one or more services of the plurality of cloud computing systems. The method also includes causing the first one or more services to execute the one or more workloads.

(G2) In some implementations of (G1), selecting the first one or more services includes selecting, from a plurality of services of the plurality of cloud computing systems, a first service that satisfies one or more service level agreements (SLAs) and one or more security requirements for the one or more workloads.

(G3) In some implementations of any of (G1)-(G2), the method further includes connecting to the first one or more services executing on the plurality of cloud computing systems via a second one or more APIs. The method also includes determining cloud inefficiencies of the first one or more services based at least on performance data obtained from the second one or more APIs. The method also includes selecting, based on the mapping, a second one or more services of the plurality of cloud computing systems to mitigate the cloud inefficiencies. The method also includes providing a third one or more APIs to retrieve results for the one or more workloads. The method also includes causing the first one or more services to cease executing the one or more workloads. The method also includes causing the second one or more services to start executing the one or more workloads.

(G4) In some implementations of (G3), determining the cloud inefficiencies includes: determining types of services (e.g., IaaS, PaaS, SaaS) for the first one or more services based on the performance data obtained from the second one or more APIs; determining states of one or more computing resources corresponding to the first one or more services based on the types of services and performance parameters obtained from the second one or more APIs; and determining the cloud inefficiencies using one or more cloud wastage templates (CWTs) based on the states of one or more computing resources. The one or more cloud wastage templates follow conventions (e.g., written/generated according to grammar rules) of a domain specific language (DSL) that describe the plurality of cloud computing systems.

(G5) In some implementations of any of (G1)-(G4), selecting the first one or more services includes selecting, from a plurality of services of the plurality of cloud computing systems, a second service that minimizes an overall cost of execution of the one or more workloads on the plurality of cloud computing systems.

(G6) In some implementations of (G1), minimizing the overall cost of execution includes reducing one or more of: IaaS wastages, pricing model wastages, container usage wastages, data engineering resource wastages, machine learning ecosystem resource wastages, server-less resource wastages, inter-cloud wastages, SaaS licensing wastages, PaaS resources wastages, hybrid-cloud wastages, and cloud transformations wastages.

(G7) In some implementations of any of (G1)-(G6), the method further includes obtaining one or more start times for starting the execution of the one or more workloads, and selecting the first one or more services includes selecting, from a plurality of services of the plurality of cloud computing systems, a third one or more services for execution of the one or more workloads at the one or more start times. The method further includes causing the third one or more services to start the execution of the one or more workloads at the one or more start times.

(G8) In some implementations of any of (G1)-(G7), the one or more workloads include one or more cloud service provider-agnostic codes (e.g., server-less code, machine learning training jobs).

(H1) In another aspect, in accordance with some implementations, a method is provided for computing and/or visualizing cloud efficiency scores for benchmarking. The method is performed at a server having one or more processors, and memory storing one or more programs configured for execution by the one or more processors. The method includes obtaining a catalog of cloud inefficiencies of a plurality of services for a plurality of enterprise customers. The plurality of services (e.g., computing services that provide servers, storage, databases, networking, software, analytics) execute on (or provisioned on) the one or more cloud computing systems. The method also includes calculating reference cloud efficiency scores, for the plurality of enterprise customers, for the plurality of services, as a weighted sum of cloud inefficiencies for one or more categories of the plurality of services based on the catalog of cloud inefficiencies. The method also includes calculating a customer cloud efficiency score, for a first enterprise customer of the plurality of enterprise customers, for one or more services of the plurality of services, as a weighted sum of cloud inefficiencies for the one or more categories of the one or more services based on cloud inefficiencies in the catalog of cloud inefficiencies for the first enterprise customer. The method also includes computing a benchmark score, for the first enterprise customer, based on the reference cloud efficiency scores for the one or more services and the customer cloud efficiency score. The method also includes generating and reporting the benchmark score along with information related to cloud inefficiencies for the enterprise customer.

(H2) In some implementations of (H1), the method further includes, prior to obtaining the catalog of cloud inefficiencies, selecting the plurality of enterprise customers from similar industry as the first enterprise customer.

(H3) In some implementations of any of (H1)-(H2), the method further includes, prior to obtaining the catalog of cloud inefficiencies, selecting the plurality of enterprise customers from a list of enterprise customers that run similar workloads as the first enterprise customer.

(H4) In some implementations of any of (H1)-(H3), the one or more services include SaaS, PaaS, and IaaS.

(H5) In some implementations of any of (H1)-(H4), the method further includes determining the cloud inefficiencies for the one or more categories of the plurality of services based on the catalog of cloud inefficiencies.

(H6) In some implementations of any of (H1)-(H5), the method further includes determining the one or more services from a list of services based on information obtained from the one or more cloud computing systems.

(H7) In some implementations of any of (H1)-(H6), the electronic device has a display, and the method further includes generating and displaying, using the display, a visualization based on the benchmark score.

(H8) In some implementations of (H7), the visualization includes one or more affordances corresponding to details of the benchmark score.

(H9) In some implementations of (H8), the method further includes detecting input from a user to select a first affordance of the one or more affordances, the first affordance corresponding to the one or more services, and, in response to detecting the input, displaying information on cloud inefficiencies for the one or more services.

(H10) In some implementations of (H9), the method further includes detecting input from a user to select a second affordance of the one or more affordances, the second affordance corresponding to the one or more categories, and, in response to detecting the input, displaying information on cloud inefficiencies for the one or more categories.

(H11) In some implementations of any of (H1)-(H10), the method further includes obtaining weights for the one or more categories of the one or more services, and calculating the weighted sum of cloud inefficiencies for the one or more categories of the one or more services is further based on the weights for the one or more categories.

(H12) In some implementations of any of (H1)-(H11), the one or more categories include: CPU usage, disk usage, system or application integrity, network usage, system uptimes, and container.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that help enterprise companies improve efficiency of their cloud deployments.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

FIG. 2B is a diagram of the cloud efficiency data included in the memory of the cloud efficiency server shown in FIG. 2A, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Cloud Efficiency Engineering Platform

Figure 1:
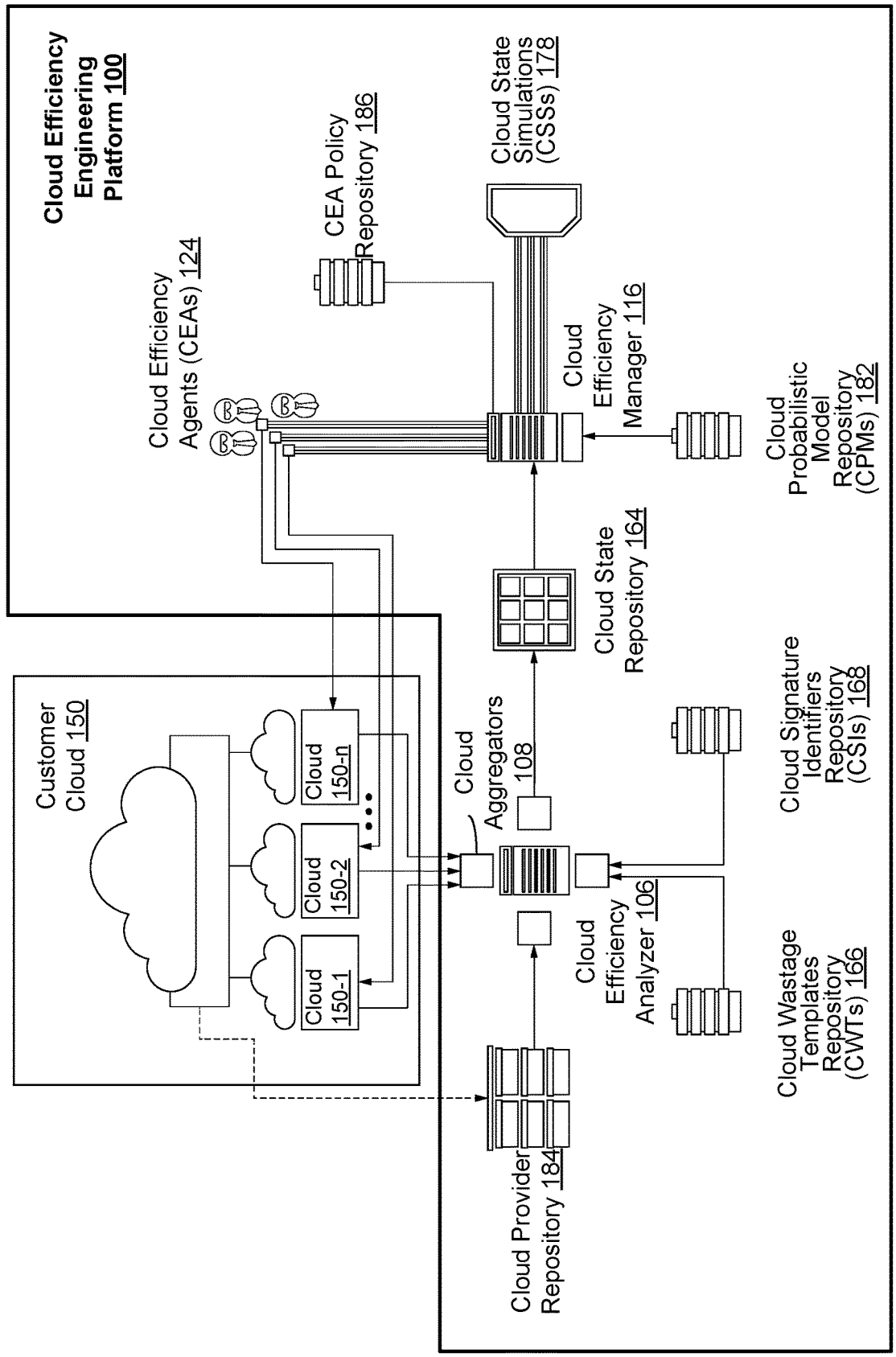
FIG. 1 is a schematic diagram of a computing platform for improving cloud efficiency, according to some implementations.

FIG. 1 is a schematic diagram of a computing platform 100 for improving cloud efficiency, according to some implementations. The computing platform includes one or more cloud efficiency analyzers 106 coupled to one or more services executing on one or more cloud computing systems 150 (e.g., cloud 150-1, cloud 150-2, . . . , cloud 150-$n$). Each cloud efficiency analyzer 106 includes one or more cloud services data aggregators 108 configured to obtain (i) performance data from the one or more services using one or more APIs and (ii) telemetry log data from the one or more cloud computing systems 150. Each cloud efficiency analyzer 106 also includes one or more trained machine learning classifiers (e.g., neural networks) and one or more disaggregation modules coupled to the one or more cloud services data aggregators 108. The one or more trained machine learning classifiers are configured to determine one or more cloud states of one or more computing resources of the one or more cloud computing systems 150 used by the one or more services. Each cloud efficiency analyzer 106 also includes one or more cloud inefficiency identifiers coupled to the one or more trained machine learning classifiers and the one or more disaggregation modules. The one or more cloud inefficiency identifiers are configured to identify cloud inefficiencies in the one or more services using one or more cloud signature identifiers based on one or more cloud wastage templates for the one or more cloud states. The computing platform 100 also includes one or more cloud efficiency managers 116 (e.g., one or more cloud efficiency recommendation modules that recommend changes to configuration without actually reconfiguring the services) coupled to the one or more cloud efficiency analyzers 106. Each cloud efficiency manager 116 includes one or more cloud configuration determination modules configured to determine one or more candidate configurations of the one or more computing resources based on one or more cloud probabilistic models for characterizing cloud efficiency and the one or more cloud states. The one or more candidate configurations improve the efficiency of the one or more services relative to an initial configuration of the one or more computing resources. Each cloud efficiency manager 116 also includes one or more cloud reconfiguration modules that are configured to apply changes to the one or more services according to the one or more candidate configurations.

In some implementations, the computing platform 100 further includes one or more cloud wastage template repositories 166 coupled to the one or more cloud efficiency analyzers 106, configured to store the one or more cloud wastage templates. The one or more cloud inefficiency identifiers are further configured to retrieve the one or more cloud wastage templates from the one or more cloud wastage template repositories 166.

In some implementations, the computing platform 100 further includes one or more cloud signature identifier repositories 168 coupled to the one or more cloud efficiency analyzers 106, configured to store the one or more cloud signature identifiers. The one or more cloud inefficiency identifiers are further configured to retrieve the one or more cloud signature identifiers from the one or more cloud signature identifier repositories.

In some implementations, the computing platform 100 further includes one or more cloud states repositories 164 coupled to the one or more cloud efficiency analyzers 106 and the one or more cloud efficiency managers 116, configured to store the one or more cloud states. The one or more trained machine learning classifiers and the one or more disaggregation modules are further configured to store the one or more cloud states to the one or more cloud states repositories, and the one or more cloud configuration determination modules are further configured to retrieve the one or more cloud states from the one or more cloud states repositories.

In some implementations, the computing platform 100 further includes one or more cloud probabilistic model repositories 182 coupled to the one or more cloud efficiency managers 116, configured to store the one or more cloud probabilistic models. The one or more cloud configuration determination modules are further configured to retrieve the one or more cloud probabilistic models from the one or more cloud probabilistic model repositories 182.

In some implementations, the computing platform 100 further includes one or more cloud state simulation modules 178 coupled to the one or more cloud efficiency managers 116, configured to simulate changes to the one or more computing resources that improve efficiency of the one or more services based on the initial configuration. The one or more cloud configuration determination modules are further configured to determine the one or more candidate configurations by applying the one or more cloud probabilistic models on one or more output of the one or more cloud state simulation modules 178.

In some implementations, the computing platform 100 further includes one or more cloud efficiency agent modules 124 coupled to the one or more cloud efficiency managers 116, configured to apply cooperative game theory and reinforcement learning to determine the one or more candidate configurations of the one or more computing resources based on the one or more cloud probabilistic models. The one or more cloud configuration determination modules are further configured to retrieve the one or more candidate configurations from the one or more cloud efficiency agent modules 124. In some implementations, the computing platform further includes one or more cloud efficiency policy repositories 186 coupled to the one or more cloud efficiency agent modules, configured to store one or more cloud policies. The one or more cloud efficiency agent modules 124 are further configured to retrieve the one or more cloud policies from the one or more cloud policy repositories 186 and determine the one or more candidate configurations of the one or more computing resources based on the one or more cloud probabilistic models and the one or more cloud policies.

Figure 2A:
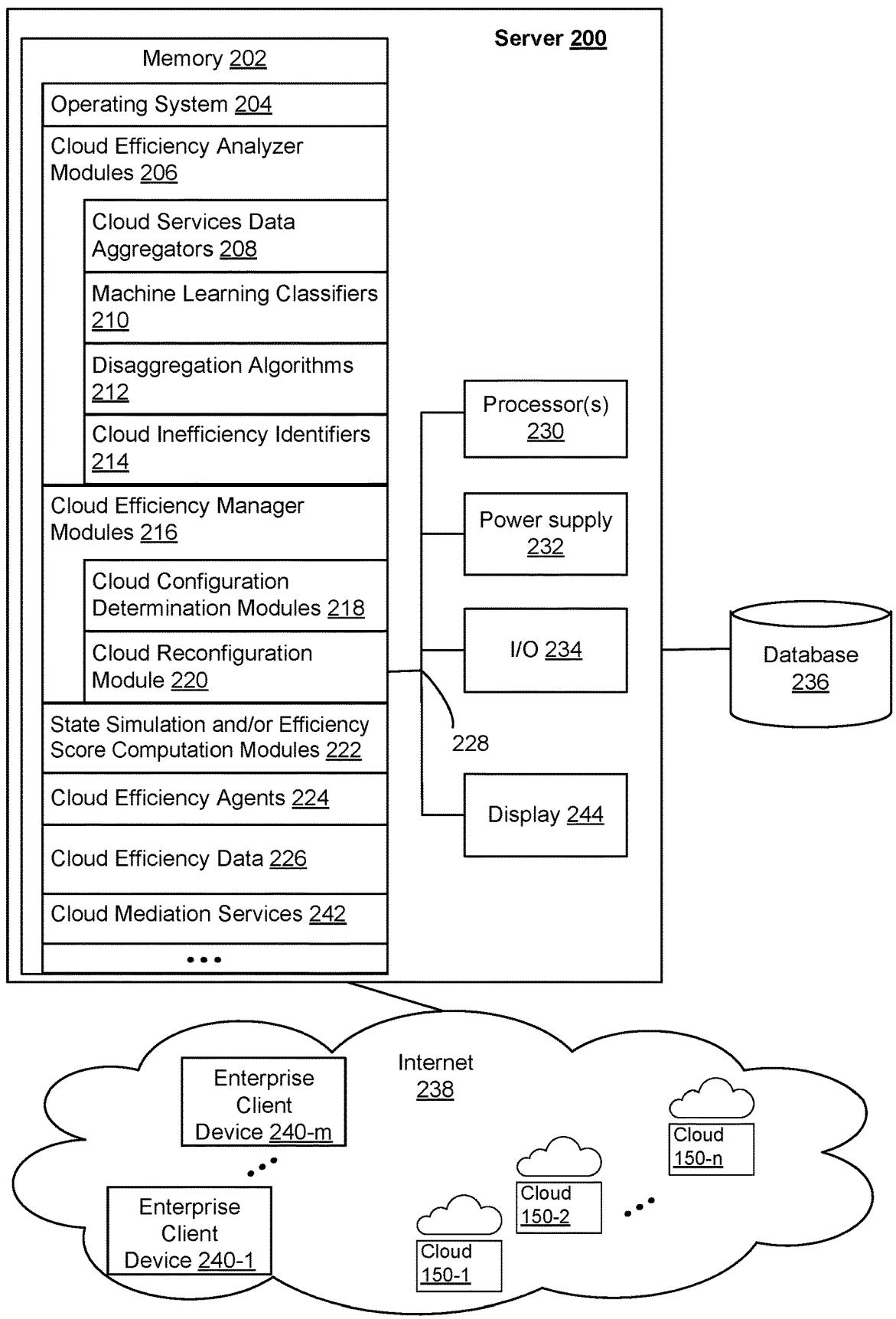
FIG. 2A is a system diagram of a cloud efficiency server in accordance with some implementations.

In some implementations, components of the computing platform 100 described above are implemented in one or more server systems as computing modules. FIG. 2A is a system diagram of a cloud efficiency server 200 in accordance with some implementations. The server 200 typically includes one or more processor(s) 230, a memory 202, a power supply 232, an input/output (I/O) subsystem 234, and a communication bus 228 for interconnecting these components. Processor(s) 230 execute modules, programs and/or instructions stored in memory 202 and thereby perform processing operations, including the methods described herein according to some implementations. In some implementations, the server 200 also includes a display 244 for displaying visualizations (e.g., simulation states, efficiency scores). In some implementations, the server 200 generates displays or visualizations, and transmits the visualization (e.g., as a visual specification) to a client device (e.g., the client devices 240-1, . . . , 240-m) for display. Some implementations of the server 200 include touch, selection, or other I/O mechanisms coupled to the server 200 via the I/O subsystem 234, to process input from users that select (or deselect) visual elements of a displayed visualization. In some implementations, the client device (or software therein) processes user input and transmits a signal to the server 200 which is processed by the server 200. Some aspects of the server 200 (e.g., the modules in the memory 202) are implemented in one or more client devices (e.g., the client devices 240-1, . . . , 240-m), according to some implementations.

In some implementations, the memory 202 stores one or more programs (e.g., sets of instructions), and/or data structures, collectively referred to as "modules" herein. In some implementations, the memory 202, or the non-transitory computer readable storage medium of the memory 202, stores the following programs, modules, and data structures, or a subset or superset thereof:

an operating system 204;
cloud efficiency analyzer modules 206 that include:
cloud services data aggregators 208 that aggregate data 270 (e.g., telemetric log data, performance data) from the cloud computing systems 150 (e.g., using one or more APIs 262 as described below);
machine learning classifiers 210 (e.g., neural networks, such as Convolutional Neural Networks (CNNs)) that determine cloud states 264 (described below; e.g., state of one or more computing resources, such as CPU, network usage), of the cloud computing systems 150. In some implementations, the machine learning classifiers 210 include feature formation modules 210-2 (shown in FIG. 5A) that form feature vectors 274 (described below) based on disaggregation data 272 (described below). In some implementations, the feature formation module 210-2 also forms features vectors based on features extracted from raw data, including system and/or application level performance data (described below). In some implementations, the feature formation module 210-2 includes feature extraction and/or feature selection capabilities. For example, the feature formation module forms new feature vectors based on the disaggregation data and/or the raw data, and/or selects features from the raw data, for classifying software, and/or for classifying cloud inefficiencies. In some implementations, the feature formation module 210-2 is an independent module (i.e., separate and distinct from the machine learning classifiers 210) in the cloud efficiency analyzer modules 206;

disaggregation algorithms 212 that include one or more energy disaggregation methods that parse energy usage of the one or more cloud computing systems by analyzing telemetric log data 270 (e.g., by analyzing electricity consumption data derived from the log data) to determine disaggregation data 272 (e.g., temporal data that indicate which services or software functions were operational during different time periods). The disaggregation algorithms help detect software or services running on the cloud computing systems 150 without having to install software or use intrusive APIs, according to some implementations; and cloud inefficiency identifiers 214 that identify cloud inefficiencies using one or more cloud signature identifiers 268 based on one or more cloud wastage templates 266 for the one or more cloud states 264. Cloud signature identifiers, cloud wastage templates, and cloud states are described below in reference to FIG. 2B, according to some implementations. In some implementations, the cloud inefficiency identifiers 214 include interpreters, and/or runtimes for executing (e.g., interpreting) the cloud signature identifiers, and/or cloud wastage templates;

cloud efficiency manager modules 216 that include:
optionally, cloud efficiency recommendation module that recommend changes to configuration without actually reconfiguring the services;
cloud configuration determination modules 218 to determine candidate configurations of one or more computing resources of the cloud computing systems 150 based on cloud probabilistic models 282 and the cloud states 264. The candidate configurations improve the efficiency of the one or more services relative to an initial configuration of the computing resources. In some implementations, the configuration determination modules 218 determine the candidate configurations by applying the cloud probabilistic models 282 on output of cloud state simulation modules 222 (described below); and
cloud reconfiguration modules 220 to apply changes to one or more services of the cloud computing systems 150 according to the one or more candidate configurations;

optionally, the cloud state simulation and/or cloud efficiency score computation modules 222. In some implementations, the modules 222 simulate changes to computing resources of the cloud computing systems 150 that improve efficiency of services running on the cloud computing systems based on an initial configuration. Examples of cloud state simulations are described below in reference to FIGS. 7 and 8, according to some implementations. In some implementations, the modules compute cloud efficiency scores (e.g., for benchmarking), as described below in reference to FIGS. 13 and 14;

optionally, cloud efficiency agent modules 224 that apply cooperative game theory and reinforcement learning to determine candidate configurations of computing resources of the cloud computing systems 150 based on the cloud probabilistic models 282. In some implementations, the cloud efficiency agent modules 224 determine the candidate configurations of computing resources of the cloud computing systems 150 further based on cloud policies 286;

cloud efficiency data 226 described below in reference to FIG. 2B; and optionally, cloud mediation services module 242 that mediate cloud services between enterprise companies and cloud computing systems, by mapping customer workloads originating from one or more enterprise client devices 240 (e.g., the devices 240-1, . . . , 240-$m$) to the cloud computing systems 150 (or services thereof) after determining an efficient mapping based on known performance data and real-time models (e.g., dynamic pricing data from cloud providers).

The above identified modules (e.g., data structures, and/or programs including sets of instructions) need not be implemented as separate software programs, procedures, or modules, and thus various subsets of these modules may be combined or otherwise re-arranged in various implementations. In some implementations, memory 202 stores a subset of the modules identified above. In some implementations, a database 236 (e.g., a local database and/or a remote database) stores one or more modules identified above and data associated with the modules. Furthermore, the memory 202 may store additional modules not described above. In some implementations, the modules stored in memory 202, or a non-transitory computer readable storage medium of memory 202, provide instructions for implementing respective operations in the methods described below. In some implementations, some or all of these modules may be implemented with specialized hardware circuits that subsume part or all of the module functionality. One or more of the above identified elements may be executed by one or more of processor(s) 202.

I/O subsystem 234 communicatively couples server 200 to one or more devices such as enterprise client devices 240 (e.g., devices 240-1, . . . , 240-$m$), the cloud computing systems 150 (e.g., 150-1, . . . , 150-$n$), via a local and/or wide area communications network 238 (e.g., the Internet) via a wired and/or wireless connection. In various implementations, the enterprise client devices 240 submit (or send requests for running) workloads for the cloud computing systems 150, check status on the cloud computing systems 150 (e.g., request efficiency scores), submit requests for configuration or reconfiguration of computing resources on the cloud computing systems 150. In some implementations, some of the operations described herein are performed by the server 200 without any initiation by any of the enterprise client devices 240. For example, the server 200 automatically determines a particular configuration of computing resources of the cloud computing systems 150 is better for performance and/or cost reasons, so the server 200 initiates reconfiguration or remapping of the resources accordingly. In some implementations, the enterprise client devices 240 submit requests or send requests to the server 200 via an application, such as a browser.

Communication bus 228 optionally includes circuitry (sometimes called a chipset) that interconnects and controls communications between system components.

FIG. 2B is a diagram of the cloud efficiency data 226 included in the memory 202 of the server 200, in accordance with some implementations. According to some implementations, the cloud efficiency data 226 includes:

cloud efficiency APIs 262 that can be used to gather data to identify cloud inefficiencies. The APIs exclude (or do not collect) data related to personally identifiable information (PII), customer lists, and similar data, unrelated to the purpose of identifying cloud inefficiencies. In some implementations, usage and performance data obtained from the APIs 262 are used to determine types of services (e.g., IaaS, PaaS, SaaS; service types, such as Big Query, and/or application service class, such as 10-T, E-Commerce) for services running on the cloud computing systems 150. In some implementations, the APIs 262 are used to obtain types of services and performance parameters useful in determining states of computing resources of the cloud computing systems 150 corresponding to services running on the cloud computing systems 150. In some implementations, the cloud efficiency APIs 262 include one or more APIs other than APIs provided by public cloud service providers. In some implementations, the cloud efficiency APIs 262 are used to retrieve results for one or more customer workloads mapped (or remapped) to services of the cloud computing systems 150;

cloud states 264 that represent software stacks, services, and/or workloads that are running on (or executing on) the computing systems 150. In some implementations, the cloud states 264 are represented according to grammar rules of a domain specific language (DSL) that describe the cloud computing systems 150. In some implementations, the grammar rules include one or more rules for expressing names of software stacks, names of classifiers, and confidence levels. In some implementations, each cloud state corresponds to cloud wastage templates and/or cloud signature identifiers;

cloud wastage templates (CWTs) 266 (described below in the section "Modeling Cloud Inefficiencies Using Domain Specific Templates");

cloud signature identifiers (CSIs) 268 (described below in the section "Identifying Cloud Inefficiencies Using Disaggregation and Machine Learning");

optionally, telemetry log and performance data 270 that includes, in various implementations, electricity usage data, performance measurements data (e.g., CPU or network usage, idle time, network activity), log output from software applications, system level data;

optionally, disaggregation data 272 that includes temporal data (e.g., data that indicates which services or software functions were operational during different time periods), and/or types of service for services running on the cloud computing systems 150. In some implementations, the disaggregation data 272 includes graphs that plot software and/or services over time (e.g., based on electrical usage data);

optionally, feature vectors 274 based on features extracted from various data sources (e.g., raw telemetry log data from the cloud computing systems 150, including system and/or application level data, disaggregation data 272) and used by one or more neural networks (e.g., convolutional neural networks) to classify software and/or service types, cloud signature identifiers 268, and/or cloud wastage templates 266;

optionally, confusion matrices 276 that include one or more tables used to describe the performance (or a confidence level) of classification models (e.g., the machine learning classifiers 210) on a set of test data on software or services running on the cloud computing systems 150 for which the true values are known. In some implementations, the server 200 (or a visualization module in the memory 202) uses the confusion matrices 276 to visualize performance of the machine learning classifiers 210. Some implementations determine the cloud states 264 by determining a confidence level using a confusion matrix 276 that encodes confidence levels for determining that specific software, services, classes or types of software components, and/or workloads ran (or executed) during one or more predetermined periods of time (e.g., between 9 am and 5 pm, on Mondays) on the cloud computing systems 150. An example confusion matrix is described below in reference to FIG. 5B, according to some implementations.

optionally, cloud state simulations 278 that include simulation states of cloud configurations, and/or cloud efficiency scores. In some implementations, cloud state simulations include cloud configurations, cost information for configurations of cloud computing resources, efficiency indicators for the cloud computing systems 150. Examples of cloud state simulations are described below in reference to FIGS. 7 and 8, according to some implementations. Examples of cloud efficiency scores are described below in reference to FIGS. 13 and 14, according to some implementations;

optionally, simulation visual specifications 280 that include specifications for visualizing, on a graphical user interface, simulation states, performance or efficiency scores, and/or cloud configurations;

optionally, cloud probabilistic models 282 that include probability distributions over states for rewarding the cloud efficiency agents 224. For example, suppose the agents 224 use reinforcement learning and cooperative game theory to find solutions to cloud efficiency problems. According to some implementations, the models 282 include a probability of ending in an end state (e.g., an improved cloud efficiency score) given that the cloud efficiency agents 224 start in an initial state or configuration (with lower cloud efficiency score than the end state) and each agent chooses actions (from a list of possible legal actions, such as increasing or reducing allocated computation resource, storage, network capacity) to cooperatively improve cloud efficiency for the cloud computing systems 150;

cloud provider data 284 that include details on cloud metrics, service types, software, services, offered by each cloud provider or the cloud computing systems 150, according to some implementations. In some implementations, the cloud provider data 284 also includes pricing information, or cost of using the services offered by the cloud providers. In some implementations, the cloud provider data also includes dynamic or real-time pricing information for using the services offered by the cloud provider. In some implementations, cloud provider data 284 includes time plots or predicted cost information for time periods for different types of services, or for running specific types of workloads; and cloud efficiency agent policies 286 that include resource constraints (e.g., available storage, CPUs or cores, network bandwidth, or similar constraints on computer resources of the cloud computing systems 150), and policy constraints (e.g., cost/$, response times, priorities, such as what data needs to be replicated) that direct or control the cloud efficiency agents 224 or their actions.

Modeling Cloud Inefficiencies Using Domain-Specific Templates

Some implementations identify or model cloud inefficiencies (problems with cloud deployments) so as to facilitate solving those inefficiencies (i.e., find alternatives that improve efficiency of cloud deployments). Some implementations identify cloud wastages including types and/or categories of cloud wastages. Some implementations model the cloud wastages using cloud wastage templates. Some implementations catalog the cloud wastages and inefficiencies in cloud infrastructure, cloud software and cloud deployments during the usage of cloud provider software and services When enterprise companies deploy on cloud, the companies typically utilize services like Infrastructure-as-a-service (IaaS) that provide access to virtual machines that mimic hardware machines. At data engineering level, some cloud systems provide facilities for reading, writing, or storing data. Some cloud systems provides containers (physical machines that include multiple smaller machines). Some cloud systems provide subscription-based network services that facilitate transfer of data between physical data centers of the enterprise companies. Enterprise companies are thus presented with a plethora of choices for cloud deployments that include wide array of options for licensing, compute, networking, and/or storage resources.

Typically, cloud systems provide three tiers, types, or categories of services: IaaS services that include resources, such as VMs, network, and storage resources; Platform-as-a-Service (PaaS) services that include resources, such as database technologies (e.g., interfaces, but not physical storage), and application servers; and Software-as-a-Service (SaaS) services that include software, such as Salesforce, and Office 365. Some implementations locate, identify, and/or quantify wastage in each of these categories. For example, for SaaS, some implementations identify that not all licenses are used by the enterprise customer. Some PaaS providers let users select between different workloads without providing sufficient information on relative advantages of each workload. Some implementations determine (or facilitate users to determine) efficient workloads (e.g., choose between a vision service and AutoML workloads).

Each category or type of service corresponds to typical wastage patterns. For example, a physical server (an 8-core machine) is configured as multiple virtual machines. Suppose a user requests a 4-core machine. The cloud system responds with an API, an IP address to access the VMs. In an enterprise company that uses (or subscribes to) thousands of such machines, typically several machines are never used. Some implementations identify and indicate these machines or servers as machines that are in a state of comatose. In some implementations, the identification process includes analyzing log output from cloud systems and applying algorithms (e.g., CPU usage below predetermined threshold, such as 5%, lack of network traffic to/from the machine, or similar confined set of rules) to determine the machines that are in the state of coma (or comatose). Identifying these inefficiencies can get complex over time and require analyzing large amount of log data. Some implementations distinguish servers that are in a state of comatose (as explained above) from other similar states that are not problematic (e.g., servers paused or waiting on external input). Some implementations adapt to changing or dynamic cloud system configurations. Some implementations use artificial intelligence (e.g., neural networks) to identify comatose or similar patterns.

As another example of wastage type, a pattern that is typical in cloud usage scenarios is part-time use of resources (sometimes called hermit services or servers). Some implementations identify patterns where a server or service is used intermittently and/or periodically. For example, an engineer logs in to a server during work hours, but is offline or discontinues use during lunch hours, evening hours, or during weekends.

As yet another example of wastage type, a typical wastage pattern is a situation where an enterprise user is unaware of (or is only partially aware of) resource requirements, but instantiates (or requests) resources much larger than actually required. For example, the enterprise user really needs only a 2-core processor, but requests an 8-core machine. This happens in situations, for example, where system architects reuse scripts that specify an outdated list of resource requirements. Some implementations identify this pattern (sometimes called misfit servers or service) to indicate servers that are over-subscribed or over-provisioned.

Some implementations quantify the identified wastages using domain specific templates (sometimes called Cloud Wastage Templates (CWTs)). Some implementations store the CWTs in one or more CWT repositories or database systems. In some implementations, the one or more CWT repositories store cloud wastage patterns for a plurality of cloud providers. In some implementations, the one or more CWT repositories store cloud wastage patterns identified by one or more neural networks and/or human operators or engineers. In some implementations, neural networks identify and/or write hundreds or even thousands of CWTs. In some implementations, the CWTs that are auto generated are labeled appropriately to identify the source (e.g., type of neural network) as well as specific conditions that caused the neural network to identify the cloud state as a cloud wastage condition.

In some implementations, CWTs are written in a domain specific language that allows cloud wastages to be expressed more clearly than general purpose languages would allow. As described above, cloud wastages are common, and categories and sub-categories of such wastages reappear sufficiently often. Representing cloud wastages using domain specific templates enables automation. Some implementations automate the process of reading, writing, and/or processing such information. In some implementations, the domain specific templates are interpreted. By storing and/or licensing repositories of CWTs that represent cloud wastages for a wide range of cloud services and/or service categories or sub-categories, some implementations build on domain expertise. Some implementations automate cloud wastage identification process based on CWTs so as to provide efficient response times (e.g., in real-time). Some implementations provide cloud configuration recommendations, and/or facilitate cloud reconfiguration, based on comparing cloud states to known CWTs.

An example CWT is provided below for illustration, according to some implementations:

```
CLOUDWASTAGE 'COMATOSE - when the CPU utilization of
server is below 0.02 for more 10 days'
    when GCP
        CPU less 0.02,
        NETWORK_OUT less 0.2,
        NETWORK_IN less 0.2
        duration greater 10 days
        neuralnet is LeNet
        deepDSL is TRUE
    then wastage is TRUE
```

In some implementations, each CWT is labeled to identify a particular cloud wastage or a class of cloud wastages. In the example shown above, the CWT identifies a COMATOSE server (described above) as a server whose CPU utilization is below for more than 10 days. The example applies to GCP (a Google cloud service) as indicated by the 'when' clause. The conditions that result in a server from being identified as a comatose server are described by the following clauses or metrics. The example specifies 'CPU less 0.02' which is interpreted as CPU usage below 2%, according to some implementations. Network usage (or lack of usage) are specified similarly under the NETWORK_OUT (e.g., outgoing network packets) and NETWORK_IN (e.g., incoming network packets) clauses. A 'duration' clause specifies a duration ('greater 10 days' in this example), according to some implementations. The duration or period for monitoring can be in minutes, hours, days, or even months in some instances. Some implementations also identify a source for CWT. In some implementations, a CWT that is generated by a neural network is identified as such. In some instances (e.g., for troubleshooting purposes), it becomes necessary to distinguish between human generated CWTs and computer generated CWTs. In some implementations, CWTs specify whether the CWTs are based on specific encoding for deep neural network processing. In the example above, the clause 'deepDSL' corresponds to DeepDSL, a domain specific language (DSL) embedded in Scala, that compiles deep networks written in DeepDSL to Java source code. In some implementations, CWTs based on DeepDSL are compiled into compact, efficient, customizable, and portable Java source code, which operates the CUDA and CUDNN interfaces running on Nvidia GPU via a Java Native Interface (JNI) library. In this way, each CWT concisely specifies one or more conditions or cloud states that correspond to a specific type of cloud wastage or a class of cloud wastages for cloud services or types of services.

As illustrated in the example shown above, CWTs follow syntax rules as specified by a domain specific language. In some implementations, the language defines specific grammar rules and/or nesting structures for each type of cloud service. In some implementations, the rules support several cloud provers and/or services. A sample list of services for one cloud provider (GCP) across service types (e.g., IaaS, PaaS, and SaaS) is shown below for illustration:

Google Compute Engine
Google Kubernetes Engine
Google Cloud Memorystore
Google Cloud Pub/Sub
Google Cloud Spanner
Google Cloud SQL
Google Cloud Storage
Google Persistent Disk
Google App Engine
Google BigQuery Service
Google Cloud Bigtable
Google Cloud Build
Google Cloud Dataflow
Google Cloud Datalab
Google Cloud Dataproc
Google Cloud Datastore
Google Cloud Endpoints
Cloud Firestore
Google Cloud Functions
Google Cloud IoT Core
Google Cloud Hardware Security Module
Google Cloud Key Management Service
Google Cloud Machine Learning Engine
Cloud Filestore
Cloud AutoML
Cloud Armor
Cloud NAT
Google Cloud CDN
Google Cloud DNS
Google Cloud Interconnect
Google Cloud Load Balancer (GCLB)
Google Cloud Router
Access Context Manager
Access Transparency BigQuery Data Transfer Service
Cloud Asset Inventory
Cloud Security Command
Cloud Source Repositories
Cloud Storage Transfer Service
Google Cloud Deployment Manager
Cloud Identity & Access Management (Cloud IAM)
Google Cloud Security Scanner
Google Service Control
Google Service Management
Service Consumer Management
Google Cloud Functions for Firebase
Google Cloud Storage for Firebase As the sample list illustrates, cloud providers have a range of cloud services. Some implementations provide an extensible list of keywords, rules (e.g., grammar or syntax rules) for each cloud service provider, and/or rules for each service provided by the cloud providers. In some implementations, keywords are overloaded or reused for different cloud providers. For example, network activity is specified by the keyword "NETWORK_OUT" for two cloud providers. In some implementations, keywords are chosen so as to match log output from individual cloud providers.

Some implementations provide a range of metrics (or conditions) to specify in CWTs. A sample list of metrics used by CWTs is provided below for illustration.

dropped_bytes_count
    cpu/reserved_cores
    cpu/usage_time
    cpu/utilization
    disk/read_bytes_count
    disk/read_ops_count
    disk/throttled_read_bytes_count
    disk/throttled_read_ops_count
    disk/throttled_write_bytes_count
    disk/throttled_write_ops_count
    disk/write_bytes_count
    disk/write_ops_count
    integrity/early_boot_validation_status
    integrity/late_boot_validation_status
    network/received_bytes_count
    network/received_packets_count
    network/sent_bytes_count
    network/sent_packets_count
    uptime
    container/accelerator/duty_cycle
    container/accelerator/memory_total
    container/accelerator/memory_used
    container/accelerator/request
    container/cpu/reserved_cores
    container/cpu/usage_time
    container/cpu/utilization
    container/disk/bytes_total
    container/disk/bytes_used
    container/disk/inodes_free
    container/disk/inodes_total
    container/memory/bytes_total
    container/memory/bytes_used
    container/memory/page_fault_count
    container/pid_limit
    container/pid_used
    container/uptime Some implementations use grammar rules or syntax rules for specifying each metric of a cloud provider. For instance, in the example CWT shown above, the metric cpu/utilization is specified using the clause "CPU less 0.02".

Figure 3:
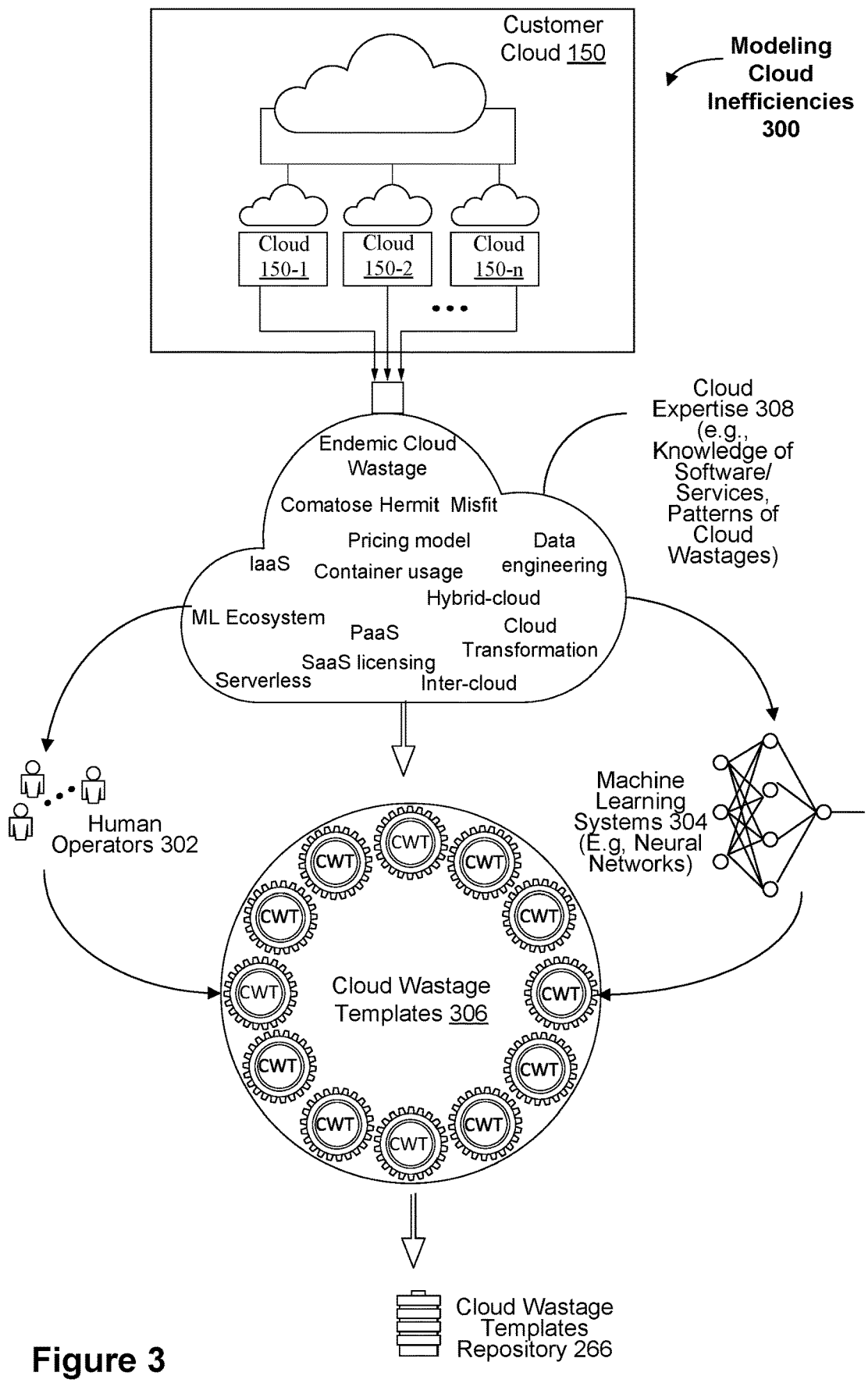
FIG. 3 is a schematic diagram of a system for modeling cloud inefficiencies using domain specific templates, according to some implementations.

FIG. 3 is a schematic diagram of a system 300 for modeling cloud inefficiencies using domain specific templates, according to some implementations. Customer cloud 150 includes one or more cloud computing systems 150-1, 150-2, . . . , 150-n. By connecting to the cloud computing systems 150 (e.g., using non-intrusive APIs), and gathering and analyzing data for cloud services or software deployed on the cloud computing systems, a body of knowledge or domain expertise 308 is built over time. Human operators 302 and/or machine learning systems 304 (e.g., neural networks) analyze the data to identify cloud wastage patterns (e.g., hermit servers, misfit servers, comatose servers, oversubscription of cloud services or compute resources) and represent the patterns using domain specific templates 306 (e.g., CWTs described above). In various implementations, the patterns include pricing model information, types of services (IaaS, PaaS, or SaaS), information on data engineering, machine learning ecosystem, cloud transformations, licensing information, inter-cloud information In some implementations, the CWTs are stored in a cloud wastage repository 266 for subsequent processing (e.g., identify and solve cloud inefficiencies). In some implementations, the machine learning systems 304 are neural networks that are trained to identify cloud wastage patterns based on features extracted from data gathered from the cloud computing systems 150. In some implementations, the system 300 includes code generation modules (not shown) that generate the domain specific templates after classifying cloud wastages.

Figure 4:
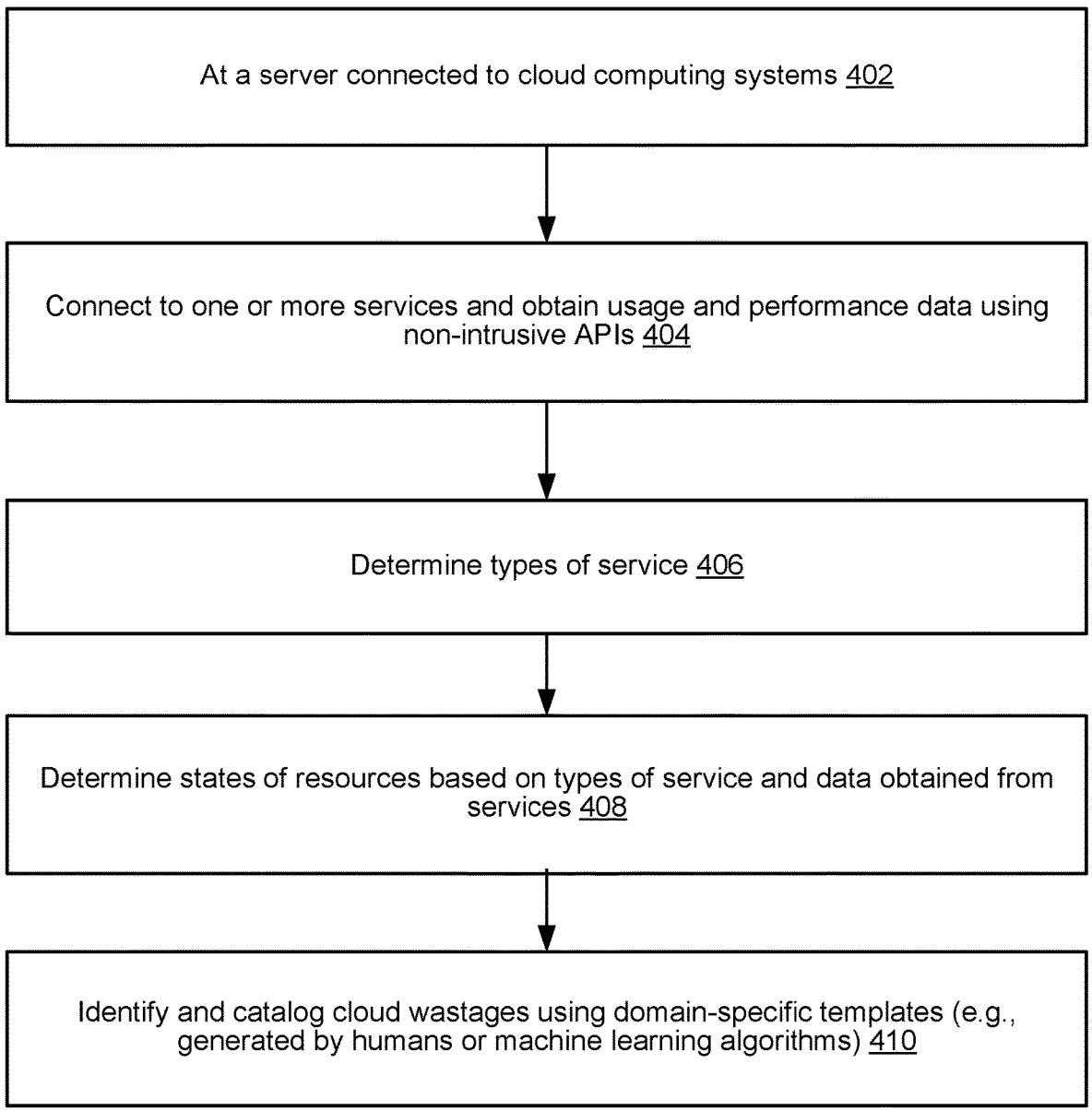
FIG. 4 is a flowchart of a method for modeling cloud inefficiencies, according to some implementations.

FIG. 4 is a flowchart of a method 400 for modeling cloud inefficiencies, according to some implementations. The method is performed (402) at the server 200 having one or more processors 230, and memory 202 storing one or more programs configured for execution by the one or more processors 230. The method 400 includes connecting (404) to one or more services, distinct from the server 200, executing on one or more cloud computing systems 150 (e.g., public cloud systems, such as AWS, GCS, Azure, private cloud systems, or hybrid cloud systems) via one or more APIs (e.g., the APIs 262; APIs designed to gather data to identify cloud inefficiencies, and exclude or not collect data related to personally identifiable information (PII), customer lists, and similar data, unrelated to the purpose of identifying cloud inefficiencies). The method 400 also includes determining (406) types of services (e.g., IaaS, PaaS, SaaS; some implementations also determine service types, such as Big Query, and/or application service class, such as 10-T, E-Commerce) for the one or more services based on usage and performance data obtained from the one or more APIs. The method 400 also includes determining (408) states of one or more computing resources corresponding to the one or more services based on the types of services and performance parameters obtained from the one or more APIs. The method 400 also includes cataloging 410 (e.g., identifying and/or modeling) cloud inefficiencies of the one or more services using one or more cloud wastage templates 266 based on the states of one or more computing resources. The one or more cloud wastage templates follow conventions (e.g., written/generated according to grammar rules) of a domain specific language (DSL) that describe the one or more cloud computing systems, as described above. The DSL-based templates can be written by a human or generated by machines (e.g., neural networks), as explained above in reference to FIG. 3. The DSL templates use labels for names when it is difficult to label neural network generated output. The DSL templates are machine readable so can be easily read and manipulated.

In some implementations, the DSL includes a persistence mapping, and the method 400 further includes storing the cloud wastage templates to a repository (e.g., the repository 166), according to the persistence mapping. In some implementations, the method 400 further includes retrieving the cloud wastage templates from the repository, prior to cataloging the cloud inefficiencies.

In some implementations, the one or more cloud wastage templates are generated by a neural network (or the classifiers 210) trained to identify cloud inefficiencies of the one or more services. In some implementations, the identified or classified cloud wastages are templatized or converted to domain specific templates (e.g., CWTs 266) (e.g., using a code generation module of the server 200).

In some implementations, the DSL includes grammar rules for describing services and metrics of the one or more cloud computing systems. Example rules are described above in reference to the example CWT illustrated above, according to some implementations.

In some implementations, the one or more cloud wastage templates include one or more predetermined wastage patterns (e.g., typical wastage patterns identified by a human) of the one or more cloud computing systems.

In some implementations, the one or more cloud computing systems facilitate Infrastructure-as-a-Service (IaaS), and the one or more predetermined wastage patterns include a comatose state (e.g., machine unused for a predetermined period of time, network that shows no traffic) of one or more servers of the one or more cloud computing systems. In some implementations, the one or more cloud computing systems facilitate Infrastructure-as-a-Service (IaaS) (e.g., VMs, networking resources, storage resources), and the one or more predetermined wastage patterns include a hermit state (e.g., intermittent use or a predetermined pattern of use) of one or more servers of the one or more cloud computing systems. In some implementations, the one or more cloud computing systems facilitate Infrastructure-as-a-Service (IaaS), and the one or more predetermined wastage patterns include a misfit state (e.g., over-subscription) of one or more servers of the one or more cloud computing systems.

In some implementations, the one or more cloud computing systems 150 facilitate Platform-as-a-Service (PaaS) (e.g., database interfaces, application servers), and the method further includes identifying one or more workloads (e.g., a vision workload instead of a machine learning workload) that improve efficiency of the one or more services.

In some implementations, the one or more cloud computing systems 150 facilitate Software-as-a-Service (SaaS) (e.g., Salesforce, Office 365), and the method further includes identifying one or more software licenses that are unused for a predetermined period of time (e.g., 30 days).

Identifying Cloud Inefficiencies Using Disaggregation and Machine Learning

Some implementations use pre-trained neural networks and disaggregation techniques to identify type of customer software or services running on cloud computing systems and cloud wastage templates or patterns (e.g., CWTs described above) used to identify cloud inefficiencies.

Figure 5A:
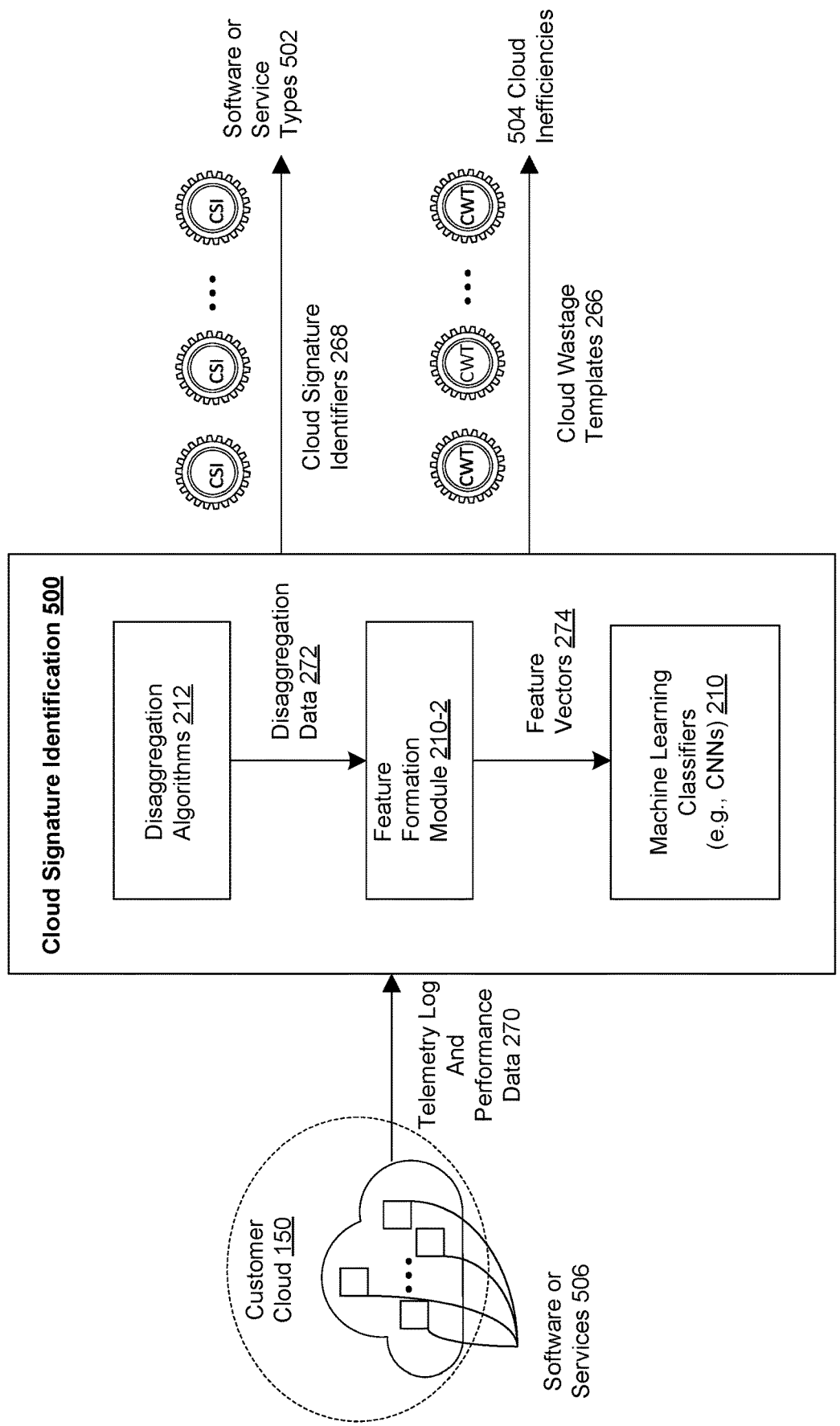
FIG. 5A is a block diagram of an example process for identifying software or service types and cloud wastage templates (used to identify cloud inefficiencies), according to some implementations.

FIG. 5A is a block diagram of an example process 500 for identifying software or service types and cloud wastage templates (used to identify cloud inefficiencies), according to some implementations. Sometimes the process 500 is called cloud signature identification. Customer cloud 150 includes one or more cloud computing systems. Suppose one or more software or services 506 are running on the cloud computing systems 150. Telemetry log and performance data, including electrical usage data, application level data, and/or system level data 270 are obtained by connecting to one or more services of the cloud computing systems. The telemetry data is input to disaggregation algorithms 212 that use electrical usage patterns to generate disaggregation data 272. The disaggregation data 272 as well as raw data 270 include several features related to CPU usage, active time periods, software functions, libraries, network usage, licensing information, and similar data that are interesting for identifying cloud inefficiencies. Relevant features are extracted and feature vectors 274 are formed from the relevant features. The feature vectors are input to convolutional neural networks 210 that are pre-trained to identify software functions (software or services types) 502 and cloud wastage templates 266 (e.g., selecting templates from the CWTs identified by human operators and/or NNs, as described above in reference to FIG. 3), according to some implementations. The CWTs 266 are used to identify cloud inefficiencies 504, according to some implementations.

Some implementations generate cloud signature identifiers (CSIs) 268 that encapsulate information on type of software/services and neural networks used to identify the type of software/services. An example CSI is shown below for illustration:

```
CLOUD-SIGNATURE-IDENTIFIER 'mongodb-4-2.csi'
CSI-ID is
'e250c3873fde9fd473437ab3d9817c3e6b58b86c4b8f2b9b4267
b70df6a704a6fad4b70159aa1
f9cb8b6c10a8dcb5d106c96e17962e689ec164cb588fa7c8f74c3
0dffc063bcc0785103656f08222f38015b4
0ef85cbda438b1b4831039351322331ad8f0bba2dc8c8aea4b7862
de409723edd70f98b706b9a1bfbb386f3620dc'
CSI-name is 'mongodb-4-2'
neuralnet is "NN-mongodb"
accuracy is 95
```

As illustrated, CSIs are similar in form to CWTs (described above), written using domain specific templates, and easily manipulated using automation tools. The CSIs are used to identify software/service types. The example shown above is a CSI for 'mongodb-4.2' (i.e., for Mongo DB 4.2). The CSI ID, the CSI-name attributes identify the CSI. The neural network used to identify the CSI is 'NN-mongodb', and the confidence level or predicted accuracy (for the software/service type) is 95%. Because the CSIs are used to identify software or service types, the CSIs support keywords corresponding to various sub-categories of software or services supported by a cloud provider.

Figure 5B:
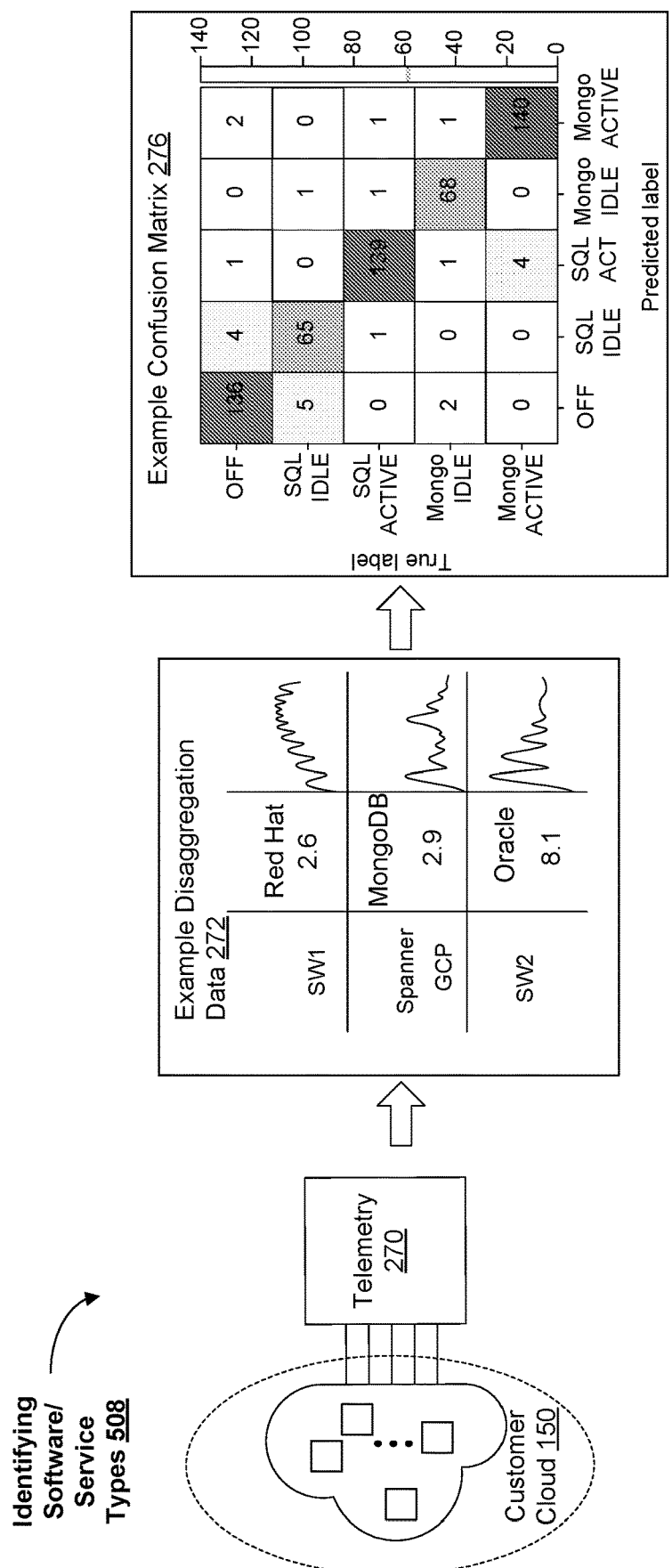
FIG. 5B is a data flow diagram illustrating data generated while identifying software or service types, according to some implementations.

FIG. 5B is a data flow diagram illustrating data generated while identifying software or service types 508, according to some implementations. In some implementations, telemetry log data 270 is collected by connecting to customer cloud 150 (or one or more software or services therein). One or more disaggregation algorithms 212 process the telemetry log data 270 to obtain disaggregation data 272, an example of which is shown in FIG. 5B. As illustrated, the disaggregation algorithms 212 identify one or more software or services (e.g., SW1, Spanner GCP, SW2). Some implementations also identify corresponding sub-categories (e.g., Red Hat 2.6 for SW1, MongoDB 2.9 for Spanner GCP, and Oracle 8.1 for SW2) for each category of software or services. Some implementations also generate a time plot of power consumption versus time. Some implementations form feature vectors 274 (e.g., using the feature formation module 210-2) based on the disaggregation data 272 (in addition to forming features vectors based on features extracted from raw data, including system and/or application level performance data) and input the feature vectors to convolutional neural networks 210. Some implementations generate confidence levels for predicting software or service types. Some implementations use a confusion matrix 276 that summarizes how successful the convolutional neural network's predictions were (i.e., the correlation between the actual software or service type or label and the neural network's classification or label).

Figure 5C:
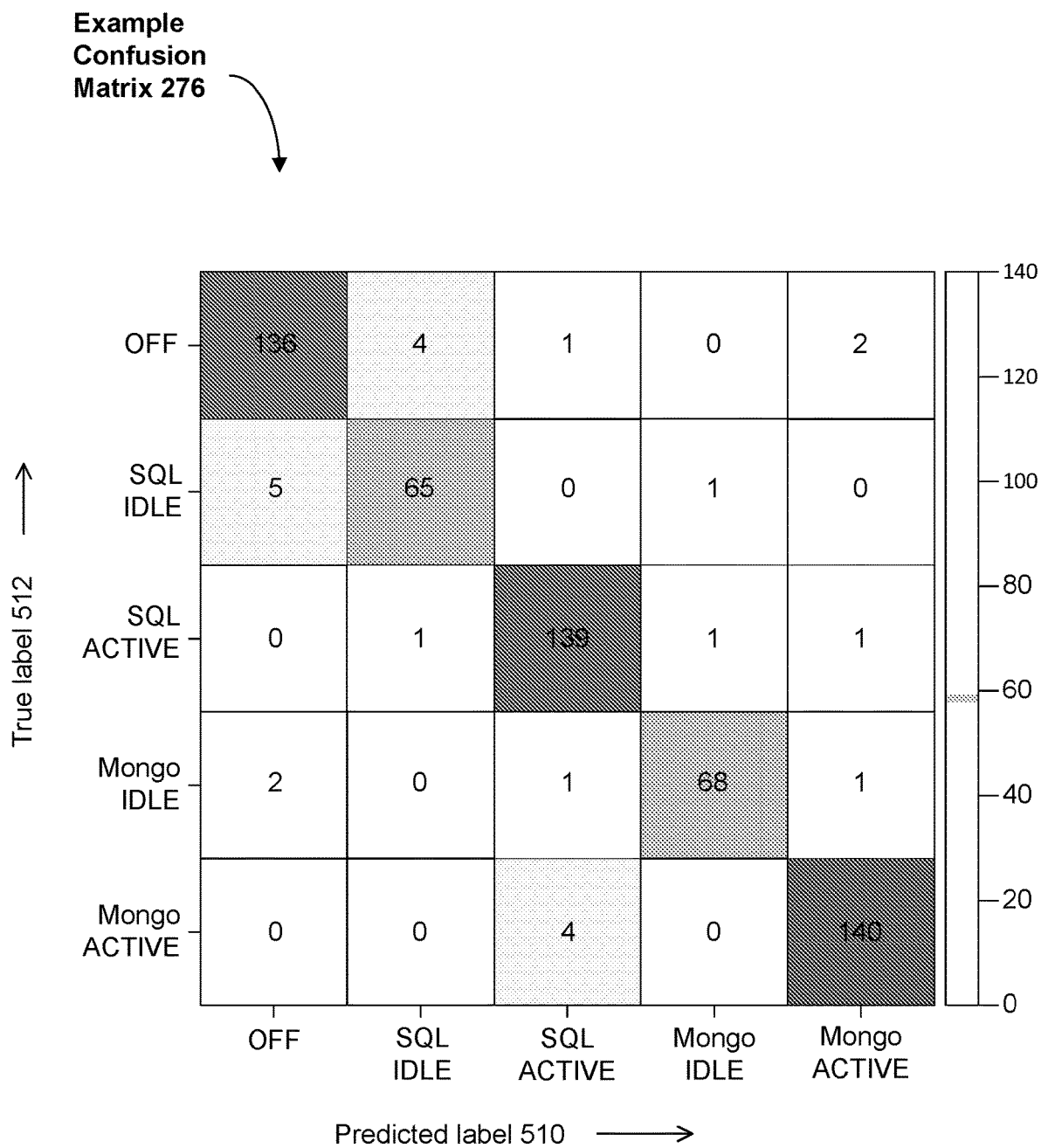
FIG. 5C is an enlarged view of the confusion matrix shown in FIG. 5B, according to some implementations.

FIG. 5C is an enlarged view of the confusion matrix 276, according to some implementations. The axis 510 of the confusion matrix is the label (software or service type) that the convolutional neural network model predicted, and the other axis 512 is the actual label. In the example shown, the convolutional neural network predicted 5 different labels: OFF label corresponding to no software or service (running on the cloud computing systems 150), SQL IDLE corresponding to SQL software in an idle state, SQL ACTIVE corresponding to SQL software in an active state, Mongo IDLE corresponding to Mongo (database) software in an idle state, and Mongo ACTIVE corresponding to Mongo software in an active state. High integer values along the diagonal indicate that the predictions by the convolutional neural networks 510 showed high accuracy. Some implementations use the confusion matrix 276 to balance training data (e.g., by changing class weighting, collecting more samples). Some implementations use the confusion matrix 276 to generate classification metrics (e.g., confidence levels for the prediction of software or service types).

Figure 6:
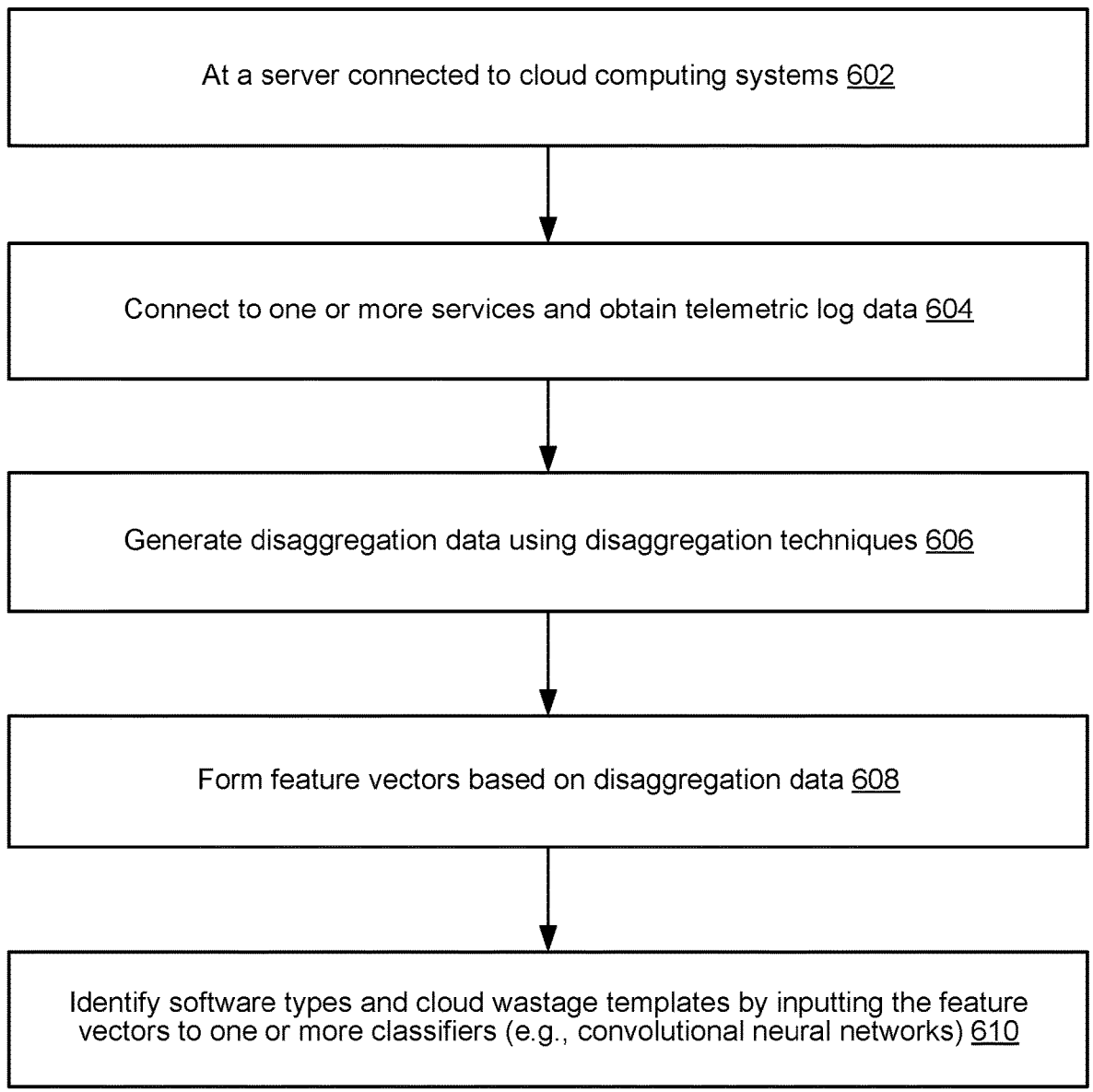
FIG. 6 provides a flowchart of a method for identifying cloud inefficiencies using disaggregation algorithms and machine learning, in accordance with some implementations.

FIG. 6 provides a flowchart of a method 600 for identifying cloud inefficiencies using disaggregation algorithms and machine learning, in accordance with some implementations. The method is performed at the server 200 having one or more processors 230, and memory 202 storing one or more programs configured for execution by the one or more processors. The method includes obtaining (604) telemetric log data (sometimes called metrics data) for one or more services, distinct from the server, executing on one or more cloud computing systems 150. The method also includes determining (or generating) (606) one or more disaggregation data 272 (e.g., temporal data, software or service types) for the one or more services based on the telemetric log data by applying one or more disaggregation algorithms 212. The method also includes forming (608) feature vectors based on the telemetric log data (in addition to features extracted from raw data corresponding to application or system level data collected from the one or more cloud computing systems 150). The method also includes identifying (610) software or service types and one or more cloud wastage templates by inputting the feature vectors to trained one or more classifiers (e.g., convolutional neural networks 210). The cloud wastage templates follow conventions (e.g., written/generated according to grammar rules) of a domain specific language (DSL) that describe the one or more cloud computing systems. Each classifier is a machine-learning model trained to identify cloud wastages for predetermined states (e.g., software stacks) of the one or more cloud computing systems. The method also includes cataloging cloud inefficiencies using the one or more cloud wastage templates based on one or more cloud states of the cloud computing systems 150. In some implementations, the one or more cloud wastage templates are derived based on output of APIs used to connect to the one or more services.

In some implementations, the one or more disaggregation algorithms 212 include an energy disaggregation algorithm that parses energy usage of the one or more cloud computing systems 150 by analyzing the telemetric log data (e.g., by analyzing electricity consumption data derived from the log data).

In some implementations, the one or more disaggregation data 272 includes temporal data (e.g., which service was operational during different time periods) for the one or more services.

In some implementations, the one or more disaggregation data 272 includes types of service for the one or more services.

In some implementations, identifying the software or service types includes determining a confidence level (e.g., using a confusion matrix) that the one or more services include one more software services or one or more workloads during one or more predetermined periods of time.

In some implementations, the one or more classifiers include one or more convolutional neural networks (CNNs) trained to classify software stacks based on software fingerprints in the telemetric log data.

In some implementations, each classifier of the one or more classifiers is trained to identify (or identify execution of) a respective software.

In some implementations, the telemetric log data includes network usage data, disk usage data, and CPU resource usage data.

In some implementations, the method further includes generating one or more reports including one or more time charts that show execution of software stacks or workloads for a predetermined period of time (e.g., minutes, or hours), the software stacks or workloads corresponding to the one or more cloud states.

In some implementations, the one or more cloud states are represented according to grammar rules of a domain specific language (DSL) that describe the one or more cloud computing systems 150. In some implementations, the grammar rules include one or more rules for expressing names of software stacks, names of classifiers, and confidence levels. In some implementations, the one or more cloud states are predetermined cloud wastage templates (CWTs).

Simulating Cloud Configurations for Improving Cloud Efficiency

Figure 7:
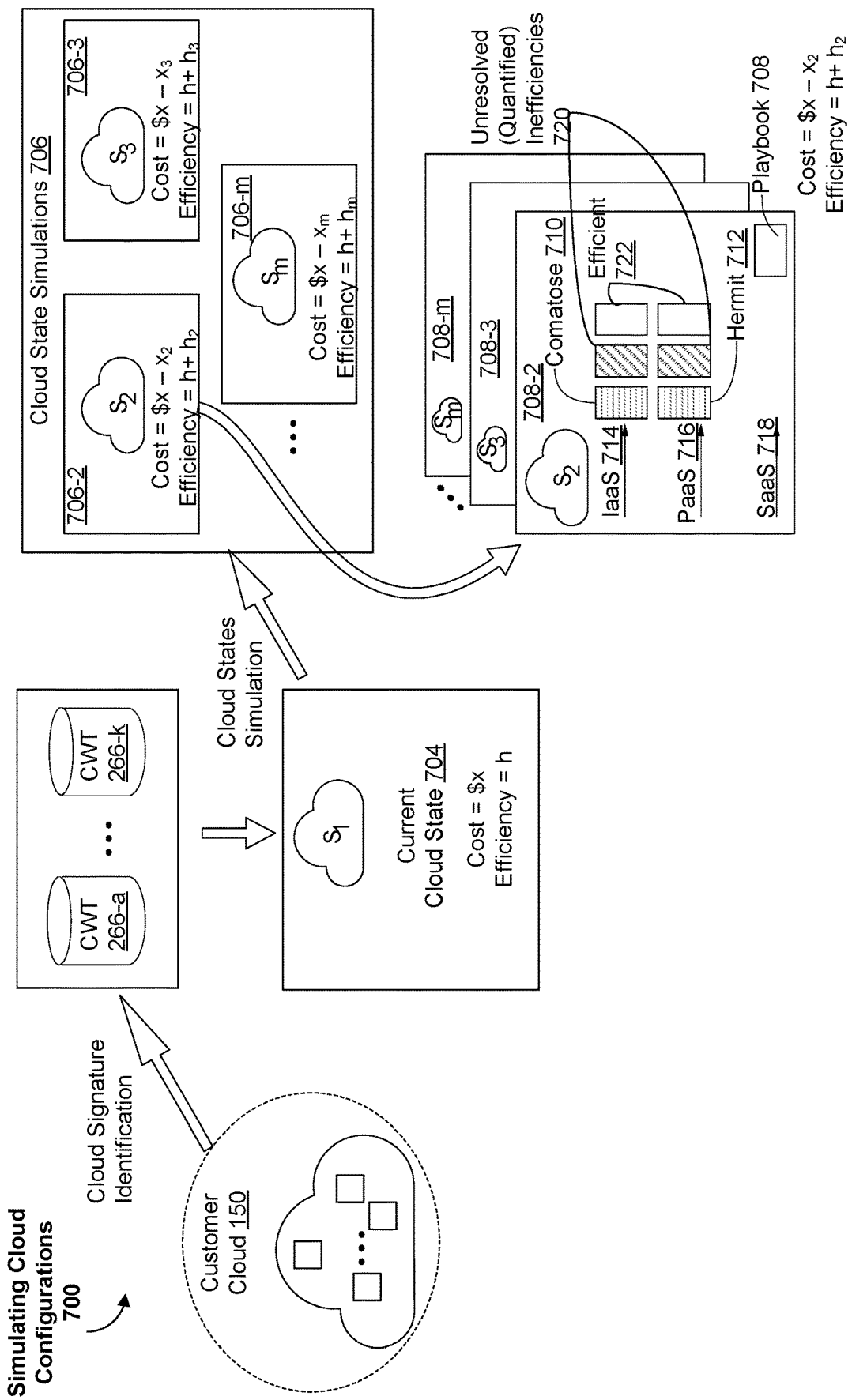
FIG. 7 is a schematic diagram of a process for simulating cloud configurations, according to some implementations.

FIG. 7 is a schematic diagram of a process 700 for simulating cloud configurations, according to some implementations. A customer cloud includes one or more cloud computing systems 150. In some implementations, each cloud computing system runs (or executes) services or software. In some implementations, each cloud computing system also includes storage systems and/or network resources. The process 700 includes connecting to the customer cloud and collecting performance and/or usage data and identifying software or service types, and/or cloud wastage templates 266 (e.g., CWT 266-1, . . . , CWT 266-$k$). Based on the CWTs, a current cloud state 704 (state $S_1$) is computed and corresponds to a configuration of one or more computing resources of the cloud computing system 150. In various implementations, the one or more computing resources include compute resources (e.g., CPUs, cores), storage resources (e.g., GBs of data storage), and/or networking resources (e.g., different types of networks). In some implementations, the current cloud state 704 encapsulates or represents a cost (e.g., x amount of dollars) for an estimated efficiency (e.g., a value η) for the configuration. For example, suppose the cost is 10 million dollars, and the efficiency is 50%, a user can interpret this data to infer that there is 5 million dollars of wastage with the cloud deployment.

The process 700 further includes simulating cloud states (e.g., finding various states) of the computing resources, such as adding or deleting compute/network/storage resources. Based on the simulations, the process obtains cloud state simulations 706 which include cloud states state $S_2, S_3, \ldots, S_m$. Similar to the initial (or current cloud state 704), the simulated cloud states 706 correspond to cost and efficiency metrics. In the example shown, the cloud state $S_2$ corresponds to cost $x-x_2$ (a reduction over $x) and improved cloud efficiency $\eta+\eta_2$. Similarly, the cloud state $S_3$ corresponds to cost $x-x_3$ (a reduction over $x) and improved cloud efficiency $\eta+\eta_3$, and the cloud state $S_m$ corresponds to cost $x-x_m$ (a reduction over $x) and improved cloud efficiency $\eta+\eta_3$. In some implementations, cloud states that correspond to an increased cost and/or reduced efficiency are discarded. In some implementations, some of the cloud states that have reduced cloud efficiency and/or increased cost are shown to a user notwithstanding the worse predicted cost and/or efficiency.

Some implementations show visualizations, sometimes called simulation playgrounds, that allow users to interactively select different cloud configurations. Some implementations display a high-level abstraction (e.g., a summary of cost, efficiency and/or resource configuration) of the cloud states (e.g., the cloud states $S_2, S_3, \ldots, S_m$). In the example shown, the high-level visualizations 706-2, 706-3, . . . , 706-m, correspond to the cloud states $S_2, S_3, \ldots, S_m$, respectively. In some implementations, when the user clicks on or selects one of the cloud states, details of the cloud state are presented. In the example shown, the user selects the cloud state $S_2$, and a more detailed view of the state is shown in a visualization 708-2. The visualization 708-2 includes details of one or more services (e.g., IaaS 714, PaaS 716, SaaS 718), and/or sub-categories of the software or services, according to some implementations. In the example shown, a resource is identified as a comatose server 710 and another server is identified as a hermit server 712, which are described above.

Some implementations display unresolved, but quantified inefficiencies 720. For example, the unresolved inefficiencies are resources that are known to be inefficient (e.g., sub-optimal use of the cloud computing systems 150) but a solution has not yet been identified. In other words, the server has quantified the inefficiencies but not yet identified a solution to address the inefficiencies. In some implementations, some of the unresolved inefficiencies 720 are switched to identified efficiencies when the server identifies solutions to the inefficiency problems. For example, the simulations are run using log data and/or CWTs collected over a first period of time based on which the system has not yet identified solutions. Subsequently, a second batch or log of data and/or CWTs reveal information that help identify solutions to the inefficiencies.

Some implementations also identify components 722 of the cloud computing systems 150 that are identified to be efficient or efficient utilization of the underlying resources. Some implementations also show a playbook 706 that summarizes cost, efficiency, and required changes to the configuration corresponding to the current state 704 to achieve the improved cost and/or efficiency. The playbook 706 provides actions a user (e.g., a cloud system administrator) could perform and/or automation steps (if the user opts) to realize the cost savings by removing wastages. The actions include, for example, removing a comatose server, changing a first configuration (e.g., a configuration of a service running on GCP) to a second configuration, according to some implementations. Some implementations link identified and/or quantified inefficiencies to one or more CWTs that help further locate, identify, and/or solve the inefficiencies.

Some implementations display the other states (e.g., the states $S_3, \ldots, S_m$) in the background. Some implementations allow the user to switch between the cloud states (e.g., by bringing a selected cloud state to the foreground and placing the deselected cloud state in the background). In this way, some implementations show optional configurations and/or changes that provide improved efficiency and/or reduced cost. Although the description explains the configurations using cost and efficiency as metrics, various other metrics are possible. For example, some implementations include capabilities for meeting service level agreements, response times, storage space, etc. in the overall simulation and/or visualization. In other words, cost and efficiency are used only as examples. In some implementations, various metrics may be emphasized in the visualizations.

Figure 8:
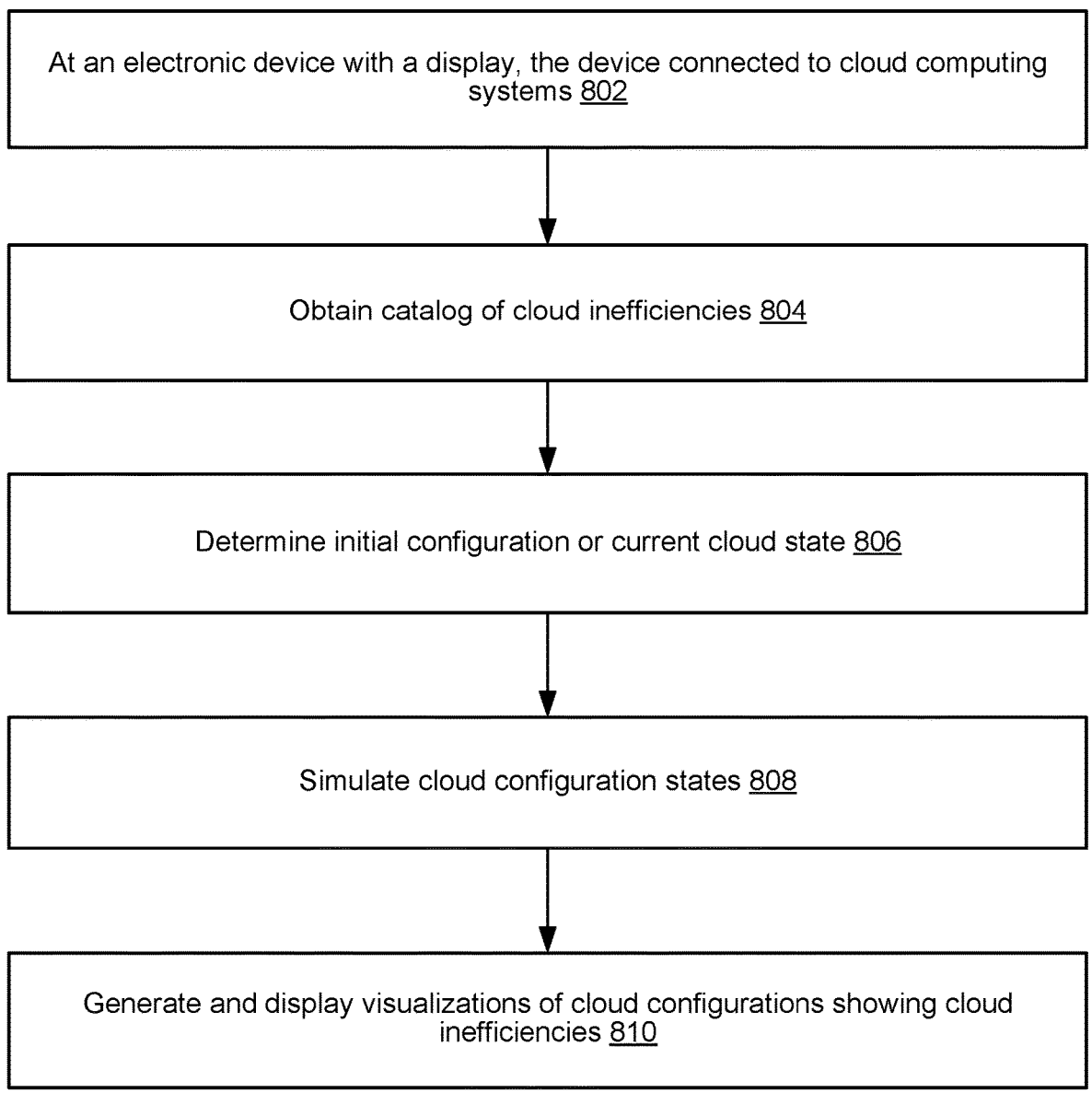
FIG. 8 provides a flowchart of a method for simulating cloud configurations, in accordance with some implementations.

FIG. 8 provides a flowchart of a method 800 for simulating cloud configurations, in accordance with some implementations. The method is performed (802) at the server 200 having a display, one or more processors 230, and memory 202 storing one or more programs configured for execution by the one or more processors. The method includes obtaining (804) a catalog of cloud inefficiencies (e.g., CWTs 266) of one or more services for an enterprise customer. The one or more services (e.g., servers, storage, databases, networking, software, analytics) execute on (or are provisioned on) the one or more cloud computing systems 150. The method also includes determining (806) an initial configuration of one or more computing resources (e.g., CPU cores, memory, network storage) of the one or more cloud computing systems 150 based on the catalog of cloud inefficiencies. The method also includes generating a first one or more configurations of the one or more computing resources by simulating (808) changes to the one or more computing resources that improve efficiency of the one or more cloud computing systems based on the initial configuration. The method also includes generating and displaying (810), on the display, one or more visualizations of the first one or more configurations of the one or more cloud computing systems. In some implementations, the one or more visualizations include at least information related to changes to the one or more computing resources. For example, in FIG. 7, the visualization 706-2 and 708-2 correspond to the cloud state $S_2$. In some implementations, the first one or more configurations include simulations per category of service, service types, and/or application or service classes. For example, the first one or more configurations include configurations from several simulations (e.g., 15 simulations that include 5. 7, and 8 simulations in 3 different categories).

In some implementations, the initial configuration includes one or more initial states (e.g., the state $S_1$ in FIG. 7) of the one or more computing resources, and simulating changes to the one or more computing resources includes simulating changes to the one or more initial states for improving efficiency of the one or more cloud computing systems 150. In some implementations, the method further includes generating and displaying, on the display, a visualization of the initial configuration of the one or more cloud computing systems, the visualization including information related to one or more initial states of the one or more computing resources.

In some implementations, generating the first one or more configurations includes: computing an initial efficiency score (or metric) for the one or more cloud computing systems 150 based on (i) the initial configuration and (ii) a predetermined model for characterizing cloud efficiency; and simulating changes to the one or more computing resources to achieve an improved efficiency score according to (i) one or more resource constraints, (ii) one or more policy constraints, and (iii) the predetermined model for characterizing cloud efficiency. In some implementations, the predetermined model includes one or more time probabilistic models for predicting a change to one or more initial states of the one or more computing resources. In some implementations, the method further includes providing one or more affordances to select the one or more resource constraints, and obtaining the one or more resource constraints by detecting selection of the one or more affordances. In some implementations, the method further includes validating the one or more resource constraints and substituting predetermined valid resource constraint values for invalid resource constraints.

In some implementations, the method further includes generating a second one or more configurations of the one or more computing resources by simulating changes to the one or more computing resources that improve efficiency of the one or more cloud computing systems based on the first one or more configurations. The method also includes generating and displaying, on the display, a second one or more visualizations of the second one or more configurations of the one or more cloud computing systems, the second one or more visualizations including information related to changes to the one or more computing resources. For example, in FIG. 7, the visualizations 706-3 and 708-3 correspond to the cloud state $S_3$. In some implementations, the method further includes displaying the second visualizations of the second one or more configurations while concurrently displaying the visualization of the first one or more configurations. For example, in FIG. 7, the visualizations 708-2 is shown in the foreground and the other visualizations 708-3, ..., 708-m, are shown in the background (or in a staggered view), so a user has access to those other visualizations. The method also includes detecting a selection of the visualization of the first one or more configurations, and, in response to detecting the selection of the visualization of the first one or more configurations, switching from displaying the second one or more visualizations to displaying the visualization of the first one or more configurations.

In some implementations, the method further includes generating a visual simulation (e.g., showing a morphing) of the change from the initial configuration (e.g., an inefficient state) to the first one or more configurations (e.g., efficient states).

Using Reinforcement Learning and Game Theory to Improve Cloud Efficiency

Figure 9:
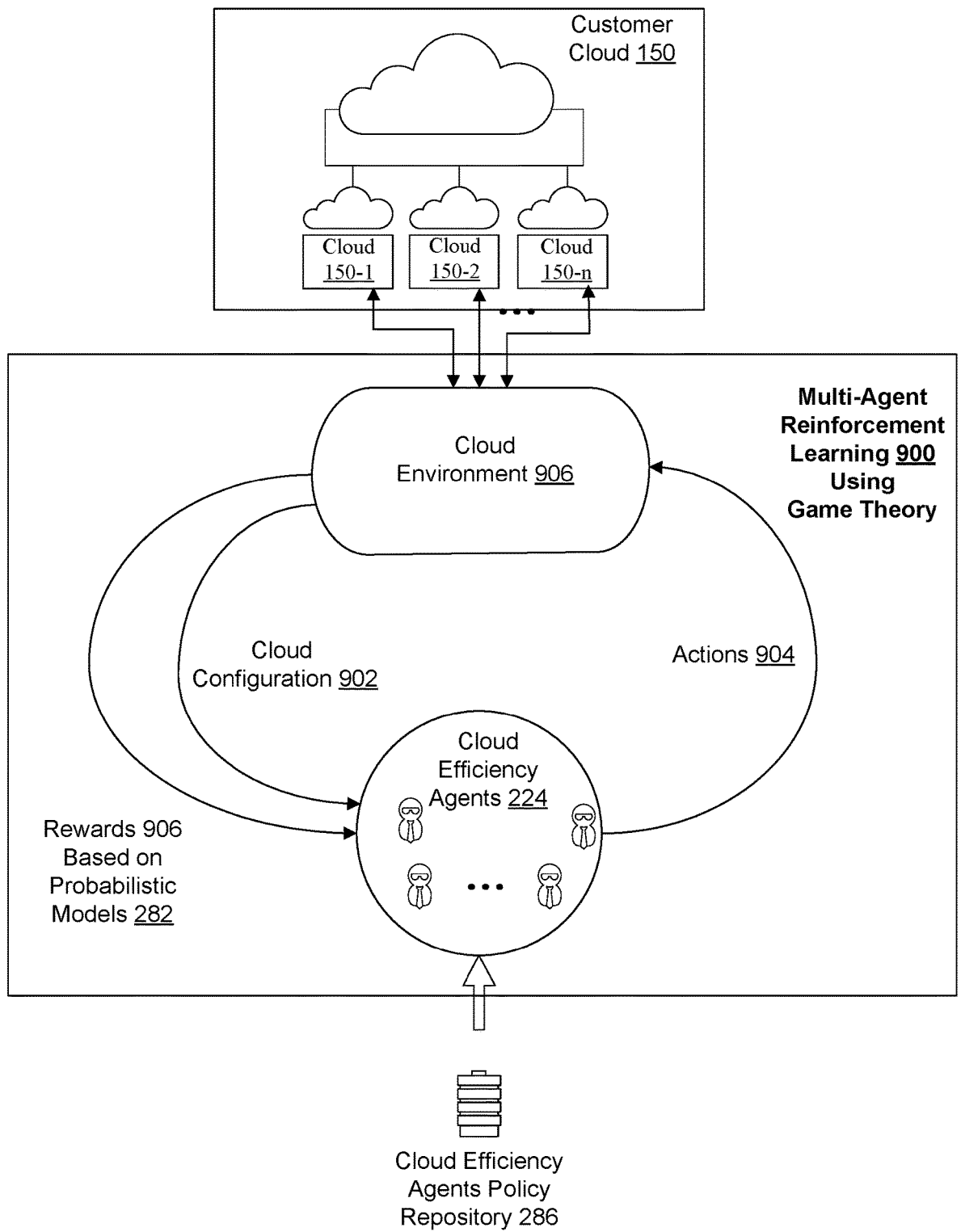
FIG. 9 is a schematic diagram of a process for improving cloud efficiencies using multi-agent reinforcement learning and game theory, according to some implementations.

FIG. 9 is a schematic diagram of a process 900 for improving cloud efficiencies using multi-agent reinforcement learning and game theory, according to some implementations. Reinforcement learning eliminates the need for training models with large amounts of data and does not require labeled data, especially in circumstances where the conditions are dynamic. Reinforcement learning adapts models dynamically for evolving cloud states. As a customer's needs change, reinforcement learning can adapt to the changing needs while reducing costs of operations. Some implementations use multiple agents to identify cloud inefficiencies and/or one or more efficient paths (e.g., a set of actions, such as modifications to how resources are used, how to run software or services) for improving cloud efficiency. A customer cloud 150 includes one or more cloud computing systems (e.g., the system 150-1, 150-2, ..., 150-n). In some implementations, each cloud computing system runs or executes services or software. In some implementations, each cloud computing system include storage systems and/or network resources.

The process 900 includes obtaining a catalog of cloud inefficiencies for the customer cloud 150 (e.g., cloud wastage templates 266). Based on the catalog, a cloud environment is computed. The cloud environment 906 is a function that transforms actions taken 904 (by efficiency agents 224) in a current cloud state (e.g., an initial configuration of the customer cloud 150, a configuration of the customer cloud after cloud efficiency agents' actions 904 have been effected) into a next cloud state or cloud configuration 902 and rewards 906 (based on probabilistic models 282) for cloud efficiency agents 224 that apply reinforcement learning and game theory to maximize cloud efficiency for the customer cloud 150 based on policy and/or resource constraints retrieved from a cloud efficiency repository 286, according to some implementations. The cloud efficiency agents 224 apply reinforcement learning to approximate the environment's function, such that when the actions are input to the black-box environment (i.e., the environment's functions are not visible to the agents) that maximize the rewards output by the environment.

In some implementations, the actions 904 are the set of all possible moves, a list of discrete, possible actions that agents 224 can take. The actions 904 include adding or subtracting resources (e.g., compute resources, network resources, storage resources), selecting resources from a choice of resources, selecting software or services, or sub-categories of services from a set of available software or services for the cloud computing systems 150, according to some implementations. In some implementations, the cloud efficiency agents take actions in a cooperative manner as coalitions, to maximize the cloud efficiency, and the rewards 906 are divided among the agents 224. Some implementations gather usage data or performance data (e.g., power consumption data) after actions taken by the efficiency agents 224 are effected in the customer cloud 150, and derive the rewards 906 further based on improvements to cost and/or efficiency of the customer cloud 150.

Figure 10:
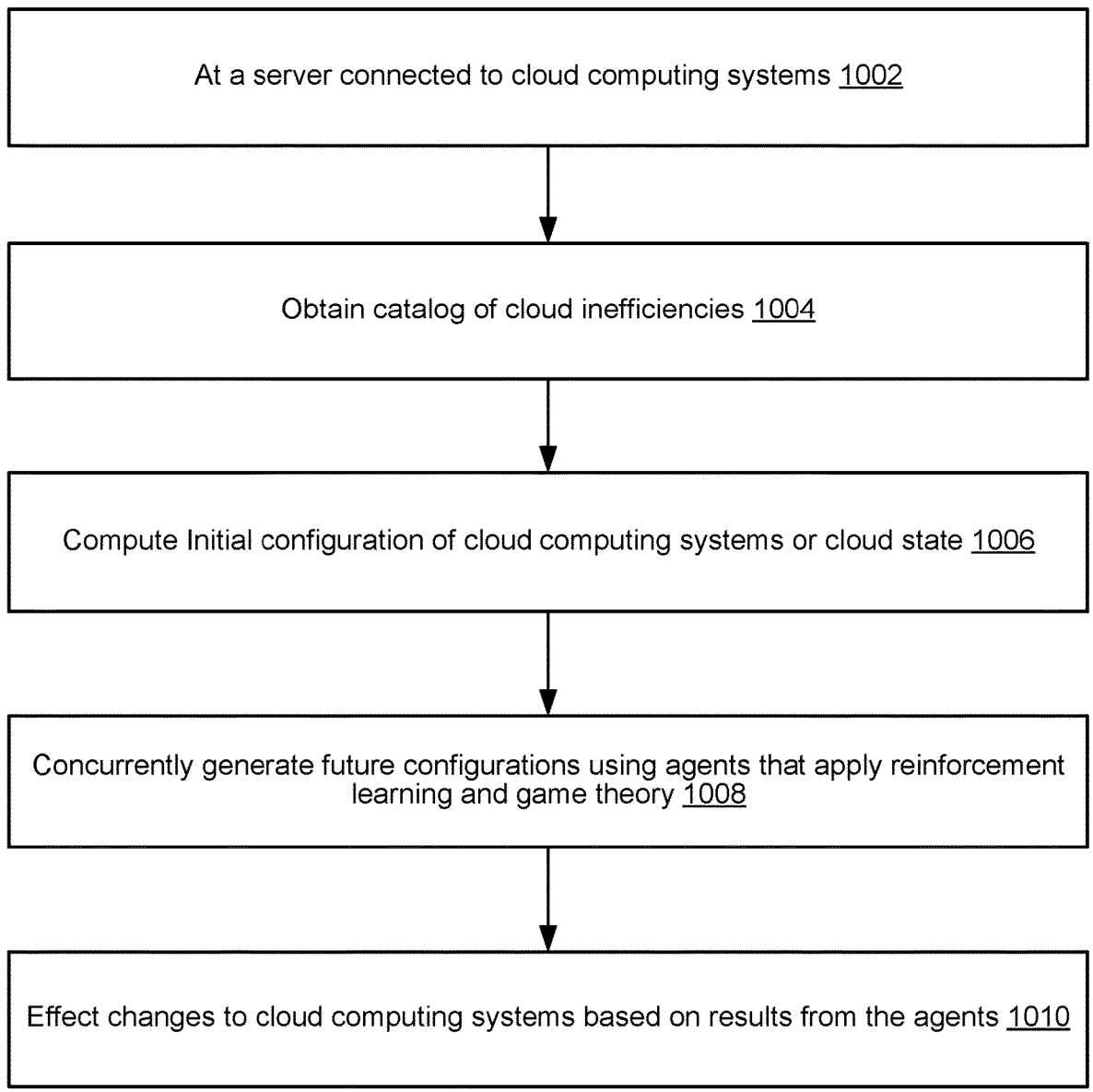
FIG. 10 provides a flowchart of a method for improving cloud efficiency using reinforcement learning and game theory, in accordance with some implementations.

FIG. 10 provides a flowchart of a method 1000 for improving cloud efficiency using reinforcement learning and game theory, in accordance with some implementations. The method is performed (1002) at the server 200 having one or more processors 230, and memory 202 storing one or more programs configured for execution by the one or more processors. The method includes obtaining (1004) a catalog of cloud inefficiencies (e.g., recipes for detecting cloud inefficiencies, samples of signals determinative of cloud inefficiencies) of one or more cloud computing systems 150 used to execute one or more services for an enterprise customer. The method 1000 also includes computing (1006) an initial configuration of one or more computing resources of the one or more cloud computing systems 150 based on the catalog of cloud inefficiencies. In various implementations, the method 1000 also includes obtaining one or more resource constraints corresponding to the one or more computing resources and one or more policy constraints corresponding to the one or more cloud computing systems. For example, the server 200 retrieves the policy and/or resource constraints from the policy repository 286.

The method 1000 also includes concurrently generating (1008), using a plurality of agents (e.g., the agents 224), a plurality of expected configurations of the one or more computing resources. Each agent identifies changes to the initial configuration to obtain at least one expected configuration that reduces inefficiencies in the one or more services based on the one or more resource constraints and the one or more policy constraints. Example policy constraints include cost/$, response times, priorities, such as what data needs to be replicated, according to some implementations. Each agent is rewarded based on a predetermined probabilistic model (e.g., the model 282) for characterizing cloud efficiency. In some implementations, the model 282 include constraints that confine space in which the agents operate. For example, for Google Cloud Services (GCS), the model includes service types, such as Big Query, type of environment (e.g., pre-production environment), and other parameters, such as type of inefficiencies (e.g., CPU or storage). The method 1000 also includes effecting (1010) changes to the one or more cloud computing systems 150 based on the plurality of expected configurations.

In some implementations, the plurality of agents applies game theory to improve efficiency of the one or more services. In some implementations, the agents apply cooperative game theory based on policy constraints.

In some implementations, the plurality of agents includes at least one agent that uses reinforcement learning to improve efficiency of the one or more services.

In some implementations, reducing inefficiencies in the one or more services includes reducing an overall cost of operating the one or more services.

In some implementations, the method further includes obtaining one or more configuration parameters and using the one or more configuration parameters to orchestrate operations of the plurality of agents.

In some implementations, the method also includes generating and displaying, on a display, a visualization of the updated configuration (or configuration after effecting changes) of the one or more cloud computing systems 150, the visualization including information related to the one or more computing resources (e.g., visual marks that indicate operational efficiency).

In some implementations, the method further includes providing one or more affordances, on the display, to select the one or more policy constraints, and obtaining the one or more policy constraints by detecting (user) selection of the one or more affordances.

Efficient Cloud Mediation Services

Figure 11:
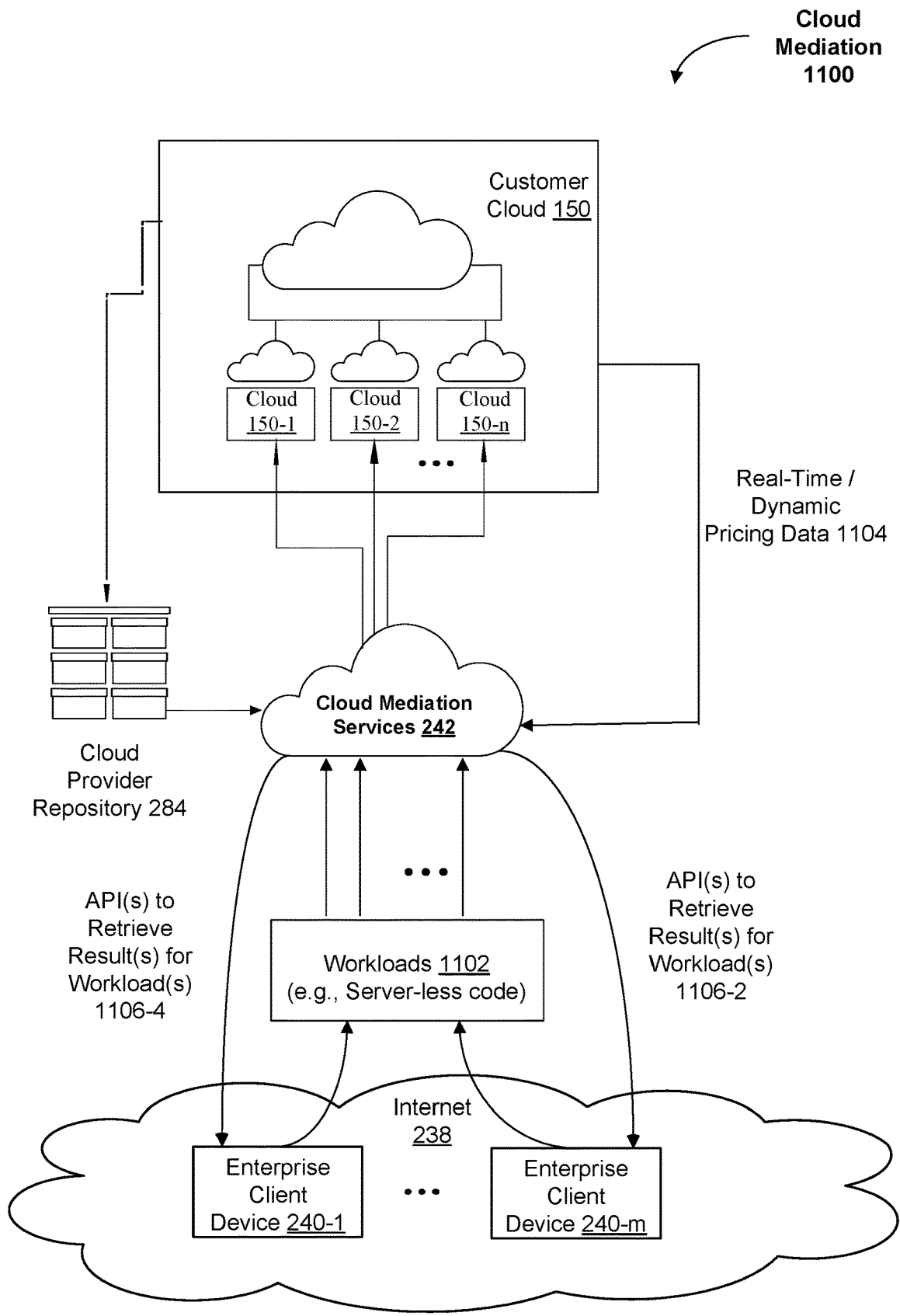
FIG. 11 is a schematic diagram of a process for efficient cloud mediation services, according to some implementations.

FIG. 11 is a schematic diagram of a process 1100 for efficient cloud mediation (sometimes called cloud mediation services), according to some implementations. Some implementations leverage information for the customer cloud 150 to map client workloads 1102 to one or more services of the customer cloud 150. In some implementations, the information includes cataloged inefficiencies of the customer cloud 150 (as explained above in reference to FIGS. 3 and 4). In some implementations, the information includes data from the cloud provider repository 284. In some implementations, the information includes dynamic information from the customer cloud 150 (or services therein), such as real-time dynamic pricing data 1104. In some implementations, the information includes available resources and/or cost estimates. As shown in FIG. 11, in some implementations, one or more enterprise client devices (e.g., the devices 240-1, . . . , 240-m) submit workloads 1102 to the cloud mediation services 242. The cloud mediation services 242 determines efficient mappings of the workloads 1102, and provide API(s) to retrieve results for the workloads. In the example shown, the cloud mediation services 242 provides API(s) 1106-2 to the enterprise client device 240-m, and provides API(s) 1106-4 to the enterprise client device 240-1. In various implementations, the APIs are reused for different workloads and/or different cloud providers. Also, in various implementations, the enterprise client devices use the API(s) provided by the cloud mediation services 242 to either directly access the cloud computing systems 150 to retrieve the result, or request the cloud mediation services 242 to retrieve the results. In some implementations, the enterprise client devices use the API(s) provided by the cloud mediation services 242 to access performance or efficiency data (e.g., efficiency scores) for the cloud computing systems 150.

In accordance with some implementations, a method is provided for efficient execution of workloads on cloud systems. The method is performed at the server 200 having one or more processors 230, and memory 202 storing one or more programs configured for execution by the one or more processors. The method includes obtaining one or more workloads (e.g., a vision workload, a machine learning workload) to execute on a plurality of cloud computing systems (e.g., the cloud computing system 150). Each workload has a plurality of execution characteristics (e.g., memory or compute requirements, such as scalar, floating-point operations), and each cloud computing system has distinct operational capabilities (e.g., security, performance, scalability).

The method also includes determining, based on a cost-benefit analysis, a mapping of the plurality of execution characteristics to the operational capabilities of the plurality of cloud computing systems. For example, as explained above in reference to FIG. 11, some implementations use cataloged inefficiencies of the customer cloud 150, data from the cloud provider repository 284, and/or dynamic information from the customer cloud 150 (or services therein), and consider a host of factors, including cost, availability of services, dynamic cloud conditions, service level agreements, software and/or hardware capabilities of the cloud computing systems 150, and nature of other workloads, while performing the cost-benefit analysis.

The method also includes providing one or more APIs (e.g., APIs other than those provided by public cloud service providers) to retrieve results for the one or more workloads. The method also includes selecting, based on the mapping, a first one or more services of the plurality of cloud computing systems. The method also includes causing the first one or more services to execute the one or more workloads.

In some implementations, selecting the first one or more services includes selecting, from a plurality of services of the plurality of cloud computing systems, a first service that satisfies one or more service level agreements (SLAs) and one or more security requirements for the one or more workloads.

In some implementations, the method further includes connecting to the first one or more services executing on the plurality of cloud computing systems via a second one or more APIs. The method also includes determining cloud inefficiencies of the first one or more services based at least on performance data obtained from the second one or more APIs. The method also includes selecting, based on the mapping, a second one or more services of the plurality of cloud computing systems to mitigate the cloud inefficiencies. The method also includes providing a third one or more APIs to retrieve results for the one or more workloads. The method also includes causing the first one or more services to cease executing the one or more workloads. The method also includes causing the second one or more services to start executing the one or more workloads. In some implementations, determining the cloud inefficiencies includes: determining types of services (e.g., IaaS, PaaS, SaaS) for the first one or more services based on the performance data obtained from the second one or more APIs; determining states of one or more computing resources corresponding to the first one or more services based on the types of services and performance parameters obtained from the second one or more APIs; and determining the cloud inefficiencies using one or more cloud wastage templates (CWTs) based on the states of one or more computing resources. The one or more cloud wastage templates follow conventions (e.g., written/ generated according to grammar rules) of a domain specific language (DSL) that describe the plurality of cloud computing systems.

In some implementations, selecting the first one or more services includes selecting, from a plurality of services of the plurality of cloud computing systems, a second service that minimizes an overall cost of execution of the one or more workloads on the plurality of cloud computing systems. In some implementations, minimizing the overall cost of execution includes reducing one or more of: IaaS wastages, pricing model wastages, container usage wastages, data engineering resource wastages, machine learning ecosystem resource wastages, server-less resource wastages, inter-cloud wastages, SaaS licensing wastages, PaaS resources wastages, hybrid-cloud wastages, and cloud transformations wastages.

In some implementations, the method further includes obtaining one or more start times for starting the execution of the one or more workloads, and selecting the first one or more services includes selecting, from a plurality of services of the plurality of cloud computing systems, a third one or more services for execution of the one or more workloads at the one or more start times. The method further includes causing the third one or more services to start the execution of the one or more workloads at the one or more start times.

In some implementations, the one or more workloads include one or more cloud service provider-agnostic codes (e.g., server-less code, machine learning training jobs).

Some implementations determine if the one or more workloads correspond to server-less code that would benefit from cloud mediation. In accordance with a determination that the one or more workloads are server-less code, the server runs or connects to a server on a cloud computing system (e.g., cloud 150-2), and dynamically manages the allocation of machine resources. In some implementations, the server 200 also includes pricing logistics for charging the enterprise client or company based on the actual amount of resources consumed by the server-less application. In some implementations, the server 200 also handles scaling, capacity planning and maintenance operations. In some implementations, the server 200 determines if the server-less code is purely server-less and uses no provisioned servers on the one or more cloud computing systems 150.

Figure 12:
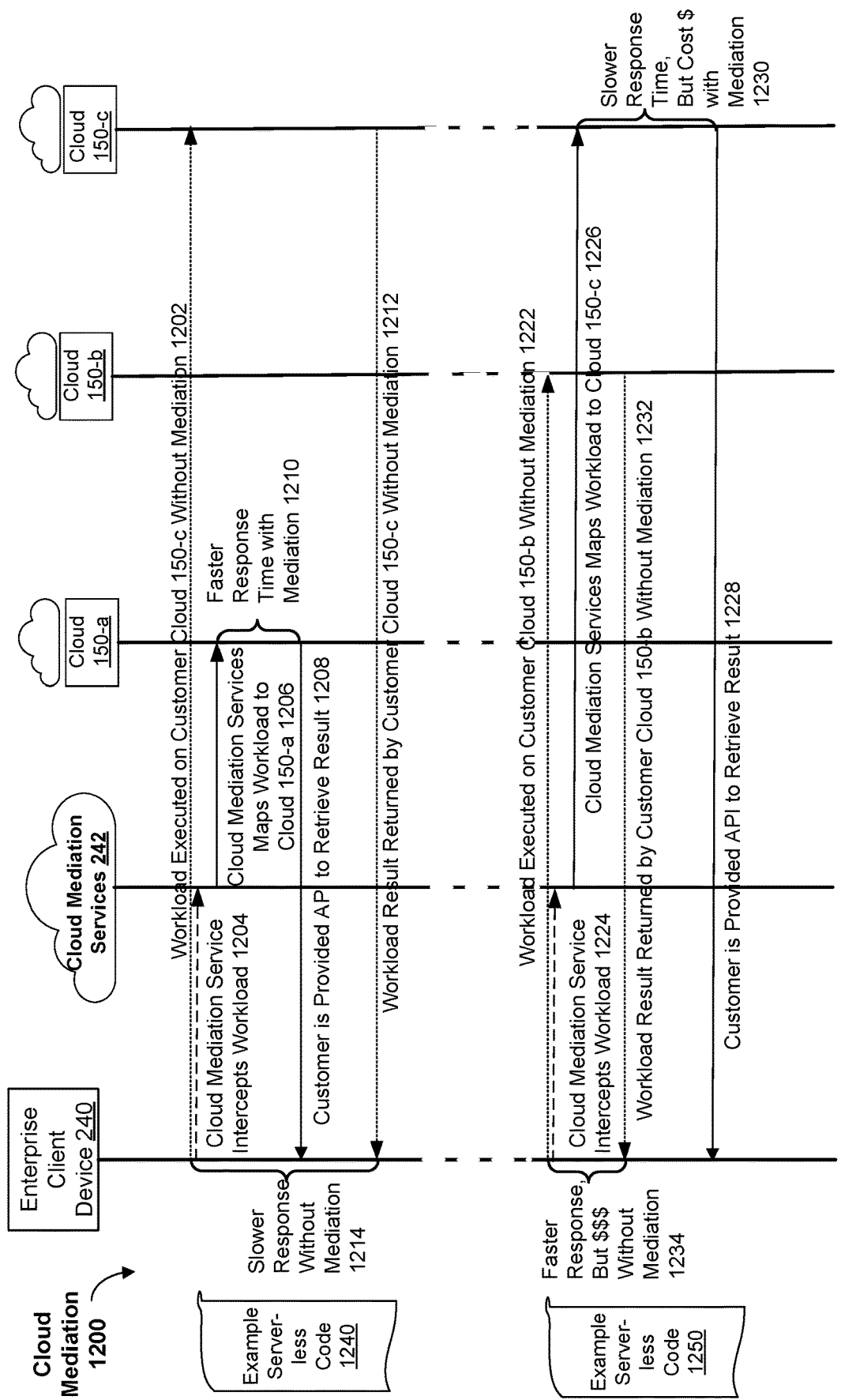
FIG. 12 is a sequence diagram illustrating a process for cloud mediation, according to some implementations.

FIG. 12 is a sequence diagram illustrating a process 1200 for cloud mediation, according to some implementations. Users of the system submit workloads (e.g., server-less code 1240, 1250) via one or more client devices (e.g., the enterprise client device 240). The sequence diagram illustrates sequence of operations (shown as solid lines) with mediation services 242 (e.g., an intermediary that intercepts workload execution requests from enterprise client devices to cloud systems 150). The sequence of operations in the absence of mediation is shown using dotted lines for comparison purposes. Some implementations seamlessly operate with and without mediation services 242. Suppose an enterprise customer or user submits or transmits, using the enterprise client device 240, a request to execute the server-less code 1240. In the absence of the mediation services 242, suppose the workload is executed (1202) on the customer cloud 150-*c*. The workload result is returned (1212) by the customer cloud 150-*c*. The response time is indicated by the label 1214. Instead, suppose the cloud mediation services 242 intercepts (1204) or receives the request. The cloud mediation services 242 determines an efficient mapping for the workload 1240. In doing so, the cloud mediation services may consider a host of factors, including cost, availability of services, dynamic cloud conditions, service level agreements, software and/or hardware capabilities of the cloud computing systems 150, and nature of other workloads. In this example, the cloud mediation service maps (1206) the workload 1240 to the cloud 150-*a*. The mapping, in various implementations, includes allocating resources (e.g., subscribing to, licensing, renting space) on the cloud 150. The customer is provided an API to retrieve results from the cloud 150-*a*. The customer uses the API to retrieve (1208) the results. The faster response time (relative to the response time 1214 without mediation services) is indicated by the label 1210. In this way, the mediation services 242 makes use of knowledge of the conditions in the cloud computing systems 150 and nature of the workload 1240, to efficiently map the workload 1240 to the cloud 150-*a* to provide fast response.

To further illustrate, consider the other example shown in FIG. 12. Suppose the enterprise client device 240 submits or transmits a request to execute the server-less code 1250. In the absence of the mediation services 242, suppose the workload is executed (1222) on the customer cloud 150-*b*. The workload result is returned (1232) by the customer cloud 150-*b*. The response time is indicated by the label 1234. Instead, suppose the cloud mediation services 242 intercepts (1224) or receives the request. The cloud mediation services 242 determines an efficient mapping for the workload 1250. In doing so, the cloud mediation services 242 considers cost as the substantial factor, although other factors, such as response time, may be relevant. Some implementations allow users override the auto-selection of factors and priorities, such as response time, cost, software and/or hardware capabilities of the cloud computing systems 150, and nature of other workloads. In this example, the cloud mediation service 242 maps (1226) the workload 1250 to the cloud 150-*c*. The customer or the client is provided an API to retrieve results from the cloud 150-*c*. The customer uses the API to retrieve (1228) the results. Although the mapping results in the slower response time (relative to the response time 1234 without mediation services) indicated by the label 1230, the cost savings are substantial (indicated as $$$ without the mediation services versus $ with the mediation services). In this way, the mediation services 242 makes use of knowledge of the conditions in the cloud computing systems 150 and nature of the workload 1240, to efficiently map the workload 1240 to the cloud 150-*a* to provide cost savings.

Computing and/or Visualizing Cloud Efficiency Scores for Benchmarking

Figure 13:
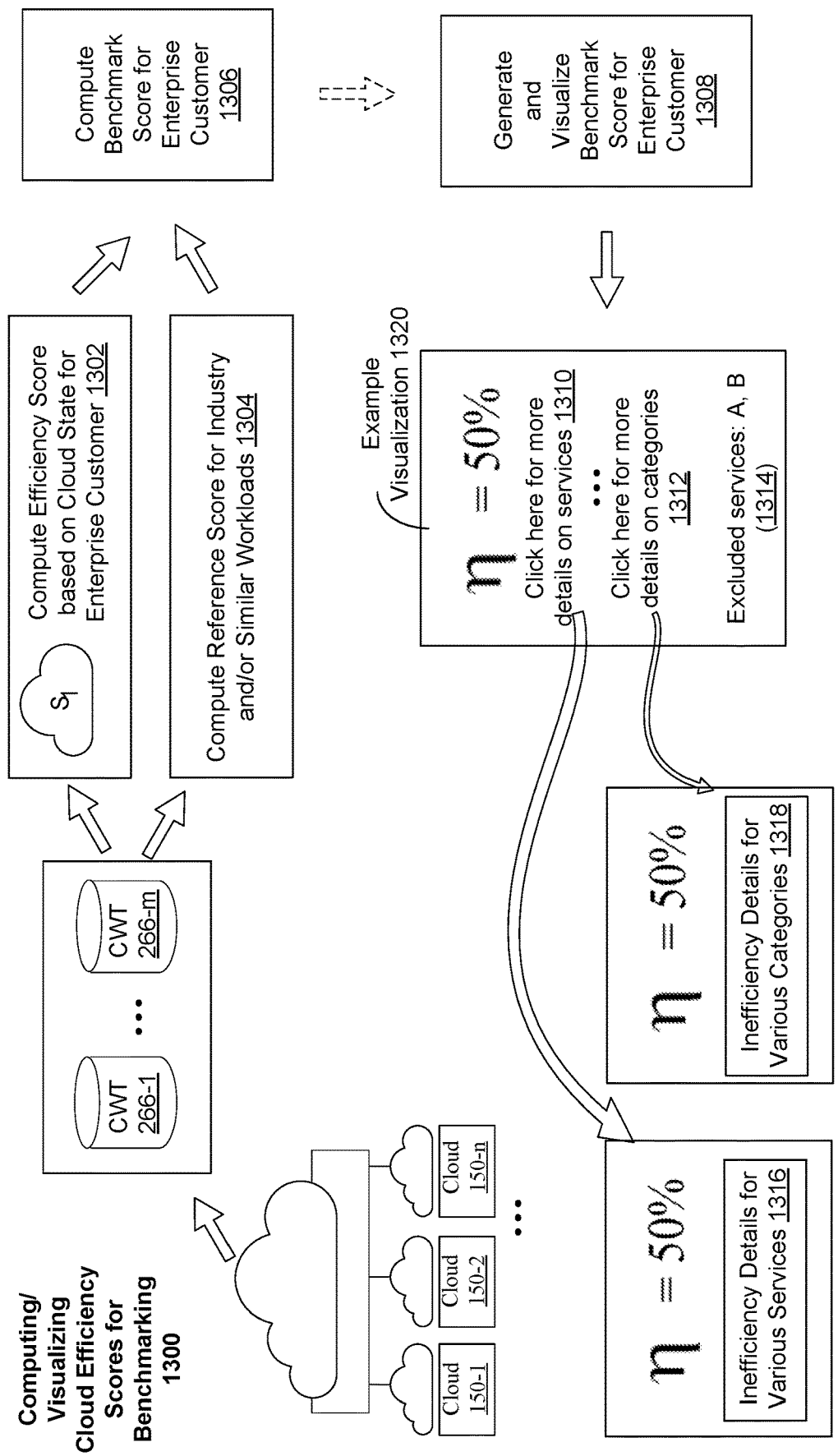
FIG. 13 is a schematic diagram of a process for computing and/or visualizing cloud efficiency scores for benchmarking, according to some implementations.

FIG. 13 is a schematic diagram of a process 1300 for computing and/or visualizing cloud efficiency scores for benchmarking, according to some implementations. Cloud computing systems (e.g., the cloud 150-1, 150-2, . . . , 150-*n*) provide cloud services, such as compute, network, and/or storage services. Enterprise companies use the cloud services provided by one or more cloud providers via the one or more cloud computing systems 150. The process 1300 includes connecting to the cloud computing systems 150 and collecting performance and/or usage data thereby identifying cloud wastage patterns or cloud wastage templates 266

(e.g., CWT 266-1, ..., CWT 266-*m*) for several customers (enterprise companies). Based on the CWTs, a current cloud state (e.g., state $S_1$) is computed and corresponds to a configuration of one or more computing resources of the cloud computing systems 150 for an enterprise customer. The process 1300 includes computing (1302) one or more efficiency scores for the enterprise customer based on the cloud state. The process 1300 also includes computing (1304) a reference score for an industry for the enterprise company (e.g., an e-commerce company belongs to the e-commerce industry), and/or similar workloads (as executed by the enterprise company). The process 1300 also includes computing (1306) a benchmark score for the enterprise customer based on the reference score and the one or more efficiency scores. In some implementations, the process 1300 includes generating and visualizing (1308) the computed benchmark score for the enterprise customer. FIG. 13 shows an example visualization 1320 that includes a display or report of the benchmark score ($\eta$=50%). In some implementations, the visualization includes one or more affordances for viewing details of the score and/or underlying cloud inefficiencies. For example, in FIG. 13, the affordance 1310 corresponds to details on services and/or related cloud inefficiencies, and the affordance 1312 corresponds to details on (service) categories and/or related cloud inefficiencies. A user can select one of the affordances and a more detailed view is presented. In the example shown, if the user clicks on the affordance 1310, the visualization switches to showing inefficiency details for various services 1316, and if the user clicks on the affordance 1312, the visualization switches to showing inefficiency details for various services 1318, according to some implementations. In some implementations, the cloud efficiency score (or the benchmark score) is computed based on data (e.g., wastage patterns) for a subset of services provided by the cloud providers that control the cloud computing systems 150. Some implementations also show excluded services when computing the efficiency/benchmark score. For the example in FIG. 13, the visualization 1320 shows that services A, and B, are excluded from the calculation of the benchmark score. In this way, cloud efficiency scores for a range of cloud configurations and/or services can be computed and benchmarked across industry categories. By providing normalized score, consumers of cloud services can use the scores to adopt different cloud technologies for their workloads. Cloud service vendors can similarly use the scores for improving their cloud offerings.

Figure 14:
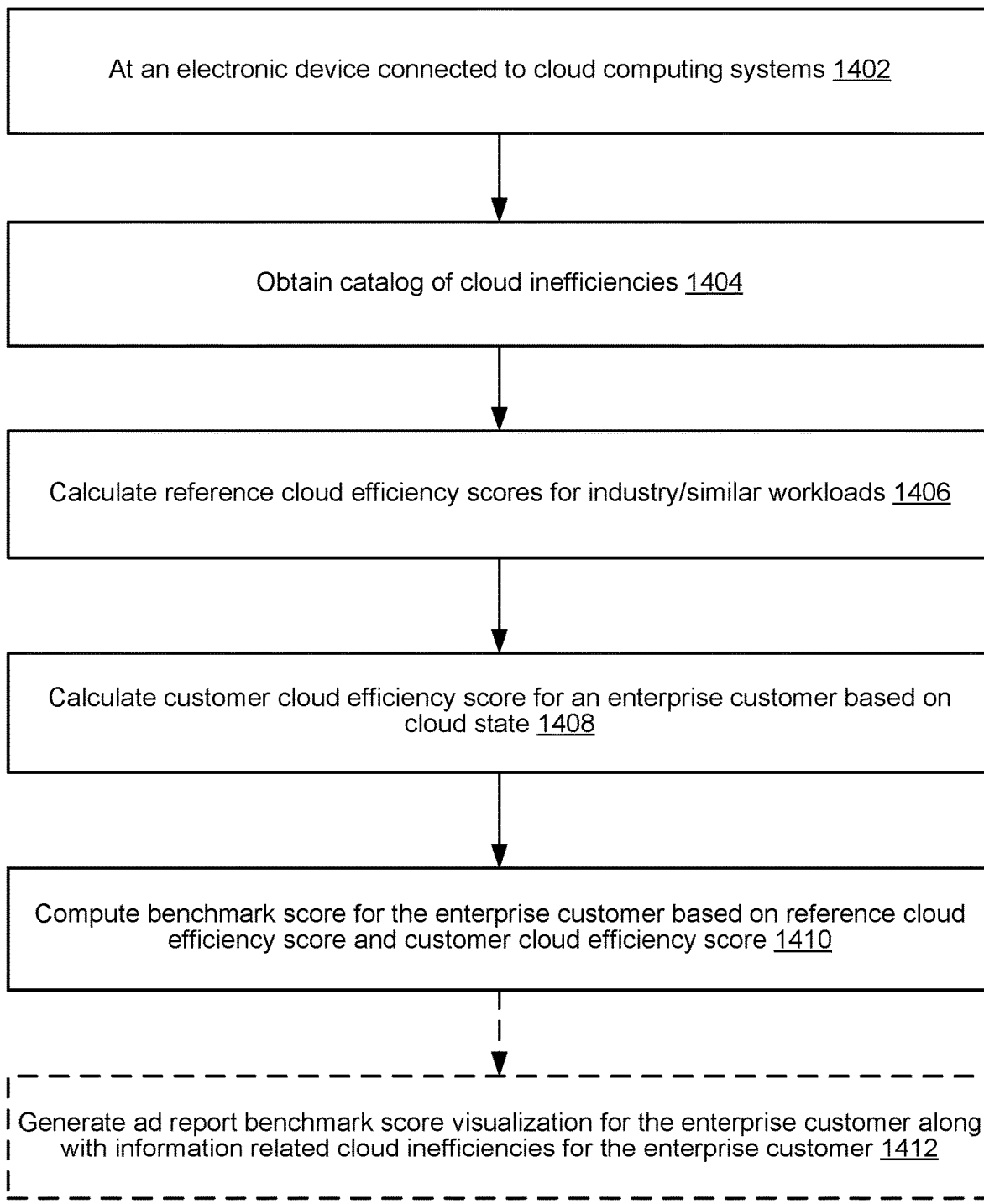
FIG. 14 provides a flowchart of a method for computing and/or visualizing cloud efficiency scores for benchmarking, in accordance with some implementations.

FIG. 14 provides a flowchart of a method 1400 for computing and/or visualizing cloud efficiency scores for benchmarking, in accordance with some implementations. The method 1400 is performed (1402) at a server 200 having one or more processors 230, and memory 202 storing one or more programs configured for execution by the one or more processors 230. The method 1400 includes obtaining (1404) a catalog of cloud inefficiencies (e.g., cloud wastage templates 266) of a plurality of services for a plurality of enterprise customers. The plurality of services (e.g., computing services that provide servers, storage, databases, networking, software, analytics) execute on (or provisioned on) the one or more cloud computing systems. The method 1400 also includes calculating (1406) reference cloud efficiency scores, for the plurality of enterprise customers, for the plurality of services, as a weighted sum of cloud inefficiencies for the one or more categories of the plurality of services based on the catalog of cloud inefficiencies. The method 1400 also includes calculating (1408) a customer cloud efficiency score, for a first enterprise customer of the plurality of enterprise customers, for one or more services of the plurality of services, as a weighted sum of cloud inefficiencies for the one or more categories of the one or more services based on cloud inefficiencies in the catalog of cloud inefficiencies for the first enterprise customer. The method 1400 also includes computing (1410) a benchmark score, for the first enterprise customer, based on the reference cloud efficiency scores for the one or more services and the customer cloud efficiency score. In some implementations, the method 1400 also includes generating and reporting (1412) the benchmark score along with information related to cloud inefficiencies for the enterprise customer.

In some implementations, the method 1400 further includes, prior to obtaining the catalog of cloud inefficiencies, selecting the plurality of enterprise customers from similar industry as the first enterprise customer.

In some implementations, the method 1400 further includes, prior to obtaining the catalog of cloud inefficiencies, selecting the plurality of enterprise customers from a list of enterprise customers that run similar workloads as the first enterprise customer.

In some implementations, the one or more services include SaaS, PaaS, and IaaS.

In some implementations, the method 1400 further includes determining the cloud inefficiencies for the one or more categories of the plurality of services based on the catalog of cloud inefficiencies.

In some implementations, the method 1400 further includes determining the one or more services from a list of services based on information obtained from the one or more cloud computing systems.

In some implementations, the server 200 has a display, and the method 1400 further includes generating and displaying, using the display, a visualization based on the benchmark score. In some implementations, the visualization includes one or more affordances corresponding to details of the benchmark score. In some implementations, the method further includes detecting input from a user to select a first affordance of the one or more affordances, the first affordance corresponding to the one or more services, and, in response to detecting the input, displaying information on cloud inefficiencies for the one or more services. In some implementations, the method further includes detecting input from a user to select a second affordance of the one or more affordances, the second affordance corresponding to the one or more categories, and, in response to detecting the input, displaying information on cloud inefficiencies for the one or more categories.

In some implementations, the method 1400 further includes obtaining weights for the one or more categories of the one or more services, and calculating the weighted sum of cloud inefficiencies for the one or more categories of the one or more services is further based on the weights for the one or more categories.

Example Processes for Improving Cloud Efficiency for Enterprise Companies

Figure 15A:
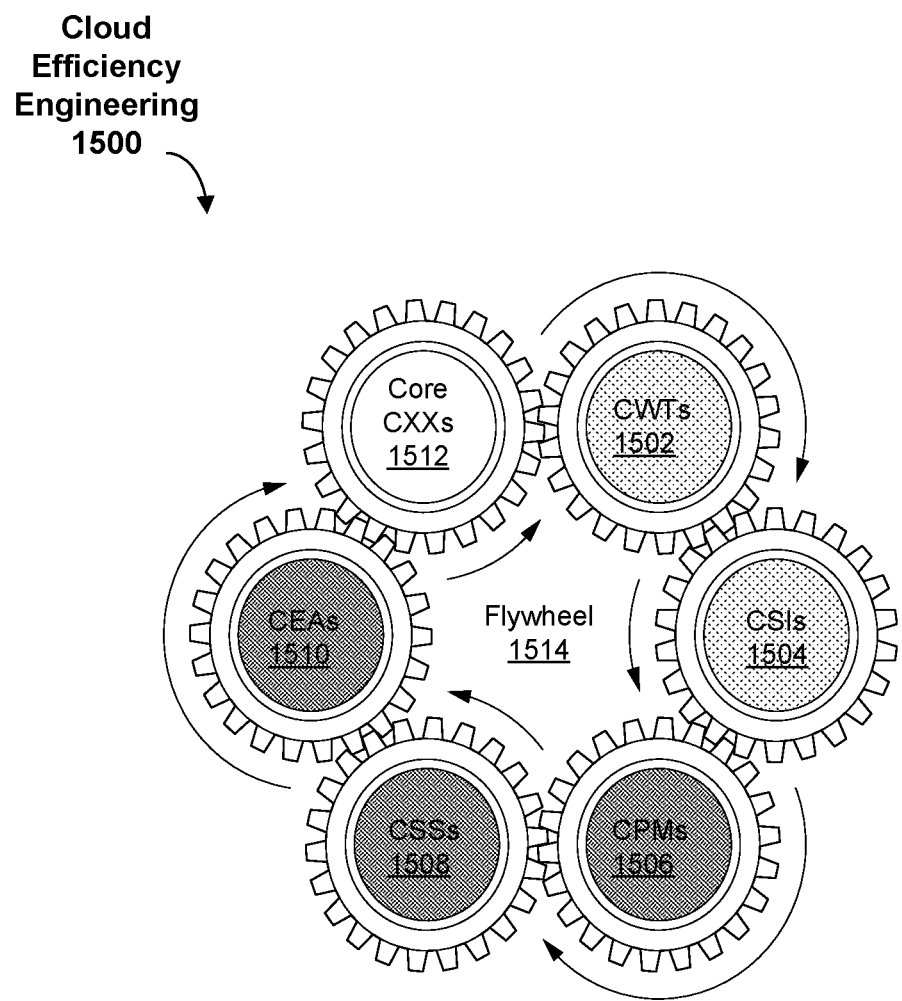
FIG. 15A is a schematic diagram of a process for improving cloud efficiency for enterprise companies, according to some implementations.

FIG. 15A is a schematic diagram of a process 1500 for improving cloud efficiency for enterprise companies, according to some implementations. Cloud efficiency engineers' domain knowledge is represented using a catalog of cloud wastage templates 1502 (e.g., CWTs described above in reference to FIGS. 1, 2A, 2B, 3 and 4) or wastage patterns that help identify wastage in a typical enterprise cloud deployment (e.g., the cloud computing systems 150). Cloud signature identifiers 1504 (e.g., CSIs described above in reference to FIGS. 1, 2A, 2B, and 5A-5C) are pre-trained deep neural net classification models for identifying cloud states in terms of software stacks, workloads and cloud wastages using CWTs, according to some implementations. CWTs and CSIs are used by cloud efficiency analyzers (e.g., the module 206) to identify cloud wastages, according to some implementations. Cloud probabilistic models 1506 (e.g., CPMs described above in reference to FIGS. 1 and 2A) represent probabilistic models of projection and/or morphing of cloud state over time, according to some implementations. Cloud state simulations 1508 (e.g., CSSs described above in reference to FIGS. 1, 2A, 2B, 7, and 8) are used to simulate morphing or changes of cloud state from an inefficient state to efficient state(s), according to some implementations. Cloud efficiency agents 1510 (e.g., CEAs described above in reference to FIGS. 1, 2A, 2B, 9, and 10) are multi-agents that output efficient future state cloud configuration(s) by competing with alternative policies and scenarios for future cloud state by applying game theory, and provide decision intelligence for reducing cloud expenditure and other cloud strategies, according to some implementations. In some implementations, cloud efficiency managers (e.g., the manager modules 216) enable the transformation from less efficient cloud state to more efficient cloud state using CWTs, CSIs, CPMs, CSSs and CEAs. Some implementations improve core cloud efficiency technologies or domain expertise 1512 based on feedback from the cloud efficiency manager, customer deployments, and/or cloud optimizations, thereby continuously improving the CWTs 1502 and/or CSIs 1504. In this way, the various components interoperate in a flywheel fashion (or in a lock-step) 1514 to improve cloud efficiencies for enterprise companies.

Figure 15B:
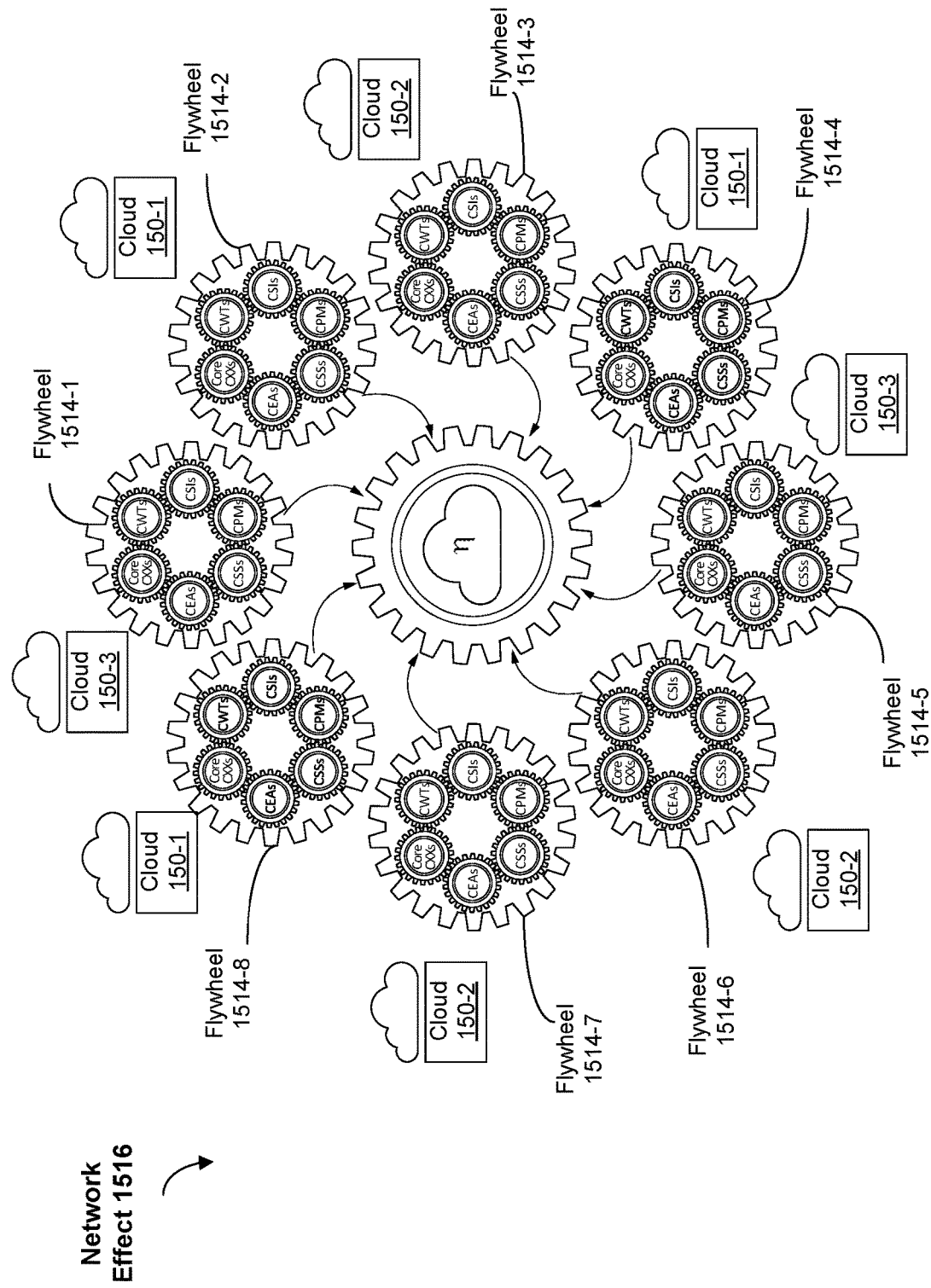
FIG. 15B is a schematic diagram illustrating network effects due to various customer deployments, according to some implementations.

FIG. 15B is a schematic diagram illustrating network effects 1516 due to various customer deployments, according to some implementations. Deployment of the cloud efficiency engineering platform 100 at various enterprise customers or on different clouds provides opportunities for cross-cloud optimizations through cross-domain knowledge or expertise. For example, learnings from deployments for a first set of enterprise customer(s) or deployments on a first set of cloud(s) could be applied to newer deployments. In this way, the technology improves with each customer deployment. The example illustrated in FIG. 15B shows flywheels (or deployments) 1514-1, 1514-2, 1514-3, 1514-4, 1514-5, 1514-6, 1514-7, and 1514-8, on customer clouds 150-3, 150-1, 150-2, 150-1, 150-3, 150-2, 150-2, and 150-1, respectively. As the example illustrates, more than one enterprise customer code could be deployed on a given cloud infrastructure. The flywheel in the center continuously learns from the various customer deployments, and uses the learnings to improve cloud efficiencies across cloud service providers.

Figure 15C:
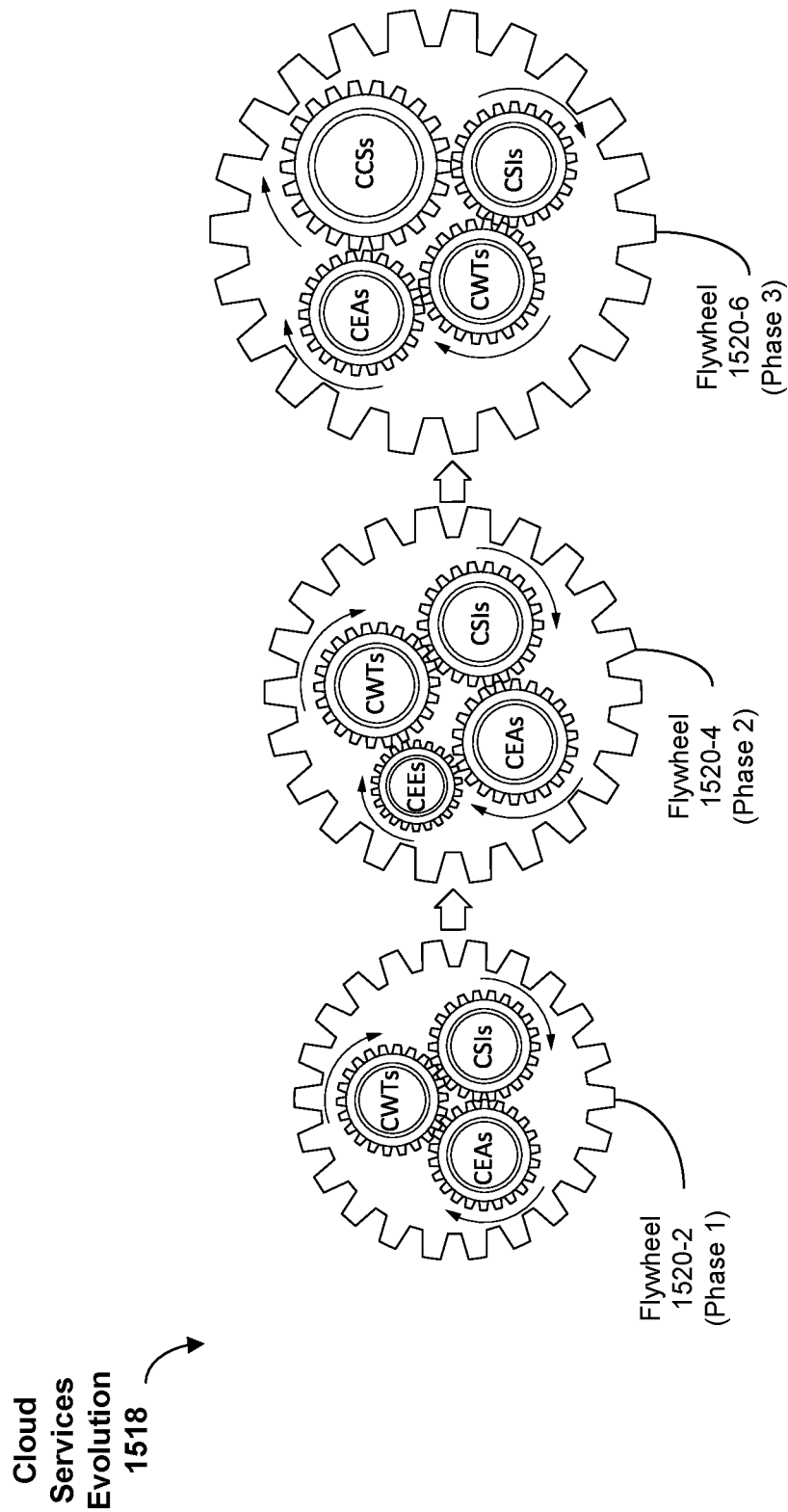
FIG. 15C is a schematic diagram illustrating cloud services evolution, according to some implementations.

FIG. 15C is a schematic diagram illustrating cloud services evolution 1518, according to some implementations. In some implementations, in a first deployment scenario, a flywheel 1520-2 consisting only of CWTs, CEEs and CSIs is deployed. Cloud efficiency analyzer(s), with the help of CWTs and CSIs, identify cloud wastages. Cloud Efficiency Engineers (CEEs) use the information output by efficiency analyzer(s) to reduce customer cloud wastage. In some implementations, in a second deployment scenario, a second flywheel 1520-4 consisting of CEEs, CEAs, CWTs, CSIs is deployed. Cloud efficiency managers, with the help of the other components, automate the constant waste reduction and optimization of customer cloud and act as efficiency guardians, according to some implementations. In some implementations, in yet another deployment scenario shown as flywheel 1520-6, CEAs, CWTs, and CSIs operate on multiple private and/or public clouds, and across various cloud services, allowing the cloud efficiency engineering platform to find efficient and/or cost-effective options for running customer workloads at any given time. Cloud services (CCSs) act as real-time intermediary to mediate running workloads in the most effective manner (given constraints at that point in time). Over time, more workloads are expected to move to server-less services and server-less cloud services market is expected to grow. As cloud computing becomes ubiquitous, and commoditized, enterprise companies are less concerned about where their workloads are run as long as service level agreements (SLAs) and security requirements are met. The techniques described herein enable that transition.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of modeling cloud inefficiencies, the method performed at a server connected to one or more cloud computing systems, the method comprising:
   connecting to one or more services, distinct from the server, executing on one or more cloud computing systems via one or more application programming interfaces (APIs);
   determining types of services for the one or more services based on usage and performance data obtained from the one or more APIs;
   determining states of one or more computing resources corresponding to the one or more services based on the types of services and performance parameters obtained from the one or more APIs; and
   cataloging cloud inefficiencies of the one or more services using one or more cloud wastage templates based on the states of one or more computing resources, wherein the one or more cloud wastage templates follow conventions of a domain specific language (DSL) that describe the one or more cloud computing systems.

2. The method of claim 1, wherein the DSL includes a persistence mapping, the method further comprising storing the cloud wastage templates to a repository, according to the persistence mapping, and retrieving the cloud wastage templates from the repository, prior to cataloging the cloud inefficiencies.

3. The method of claim 1, wherein the one or more cloud wastage templates are generated by a neural network trained to identify cloud inefficiencies of the one or more services.

4. The method of claim 1, wherein the DSL includes grammar rules for describing services and metrics of the one or more cloud computing systems.

5. The method of claim 1, wherein the one or more cloud wastage templates include one or more predetermined wastage patterns of the one or more cloud computing systems.

6. The method of claim 5, wherein the one or more cloud computing systems facilitate Infrastructure-as-a-Service (IaaS), and the one or more predetermined wastage patterns include at least one of: a comatose state of one or more servers of the one or more cloud computing systems, a hermit state of one or more servers of the one or more cloud computing systems, and a misfit state of one or more servers of the one or more cloud computing systems.

7. The method of claim 1, wherein the one or more cloud computing systems facilitate Platform-as-a-Service (PaaS), the method further comprising identifying one or more workloads that improve efficiency of the one or more services.

8. The method of claim 1, wherein the one or more cloud computing systems facilitate Software-as-a-Service (SaaS), the method further comprising identifying one or more software licenses that are unused for a predetermined period of time.

9. The method of claim 1, wherein the states includes at least one of: one or more software stacks, and one or more workloads.

10. The method of claim 1, wherein determining the states comprises determining a confidence level that the one or more services include one more software services or one or more workloads during one or more predetermined periods of time.

11. The method of claim 1, further comprising:
obtaining telemetric log data for the one or more services;
determining one or more disaggregation data for the one or more services based on the telemetric log data by applying one or more disaggregation algorithms;
forming feature vectors based on the telemetric log data; and
identifying the one or more cloud wastage templates by inputting the feature vectors to trained one or more classifiers, wherein each classifier is a machine-learning model trained to identify cloud wastages for predetermined states of the one or more cloud computing systems.

12. The method of claim 11, wherein the one or more disaggregation algorithms include an energy disaggregation algorithm that parses energy usage of the one or more cloud computing systems by analyzing the telemetric log data.

13. The method of claim 11, wherein the one or more disaggregation data includes either temporal data or types of services, for the one or more services.

14. The method of claim 11, wherein the one or more classifiers include one or more convolutional neural networks (CNNs) trained to classify software stacks based on software fingerprints in the telemetric log data.

15. The method of claim 11, wherein each classifier of the one or more classifiers is trained to identify a respective software.

16. The method of claim 11, wherein the telemetric log data includes network usage data, disk usage data, and CPU resource usage data.

17. The method of claim 1, further comprising generating one or more reports including one or more time charts that show execution of software stacks or workloads for a predetermined period of time, the software stacks or workloads corresponding to the states.

18. The method of claim 1, further comprising:
determining an initial configuration of the one or more computing resources of the one or more cloud computing systems based on the catalog of cloud inefficiencies;
generating a first one or more configurations of the one or more computing resources by simulating changes to the one or more computing resources that improve efficiency of the one or more cloud computing systems based on the initial configuration; and
generating and displaying, on a display, a first visualization of the first one or more configurations of the one or more cloud computing systems, the first visualization comprising information related to changes to the one or more computing resources.

19. A system, comprising:
one or more processors;
memory;
wherein the memory stores one or more programs configured for execution by the one or more processors, and the one or more programs comprising instructions for:
connecting to one or more services executing on one or more cloud computing systems via one or more APIs;
determining types of services for the one or more services based on usage and performance data obtained from the one or more APIs;
determining states of one or more computing resources corresponding to the one or more services based on the types of services and performance parameters obtained from the one or more APIs; and
cataloging cloud inefficiencies of the one or more services using one or more cloud wastage templates based on the states of one or more computing resources, wherein the one or more cloud wastage templates follow conventions of a domain specific language (DSL) that describe the one or more cloud computing systems.

20. A non-transitory computer readable storage medium storing one or more programs configured for execution by a computer system having one or more processors, the one or more programs comprising instructions for:
connecting to one or more services executing on one or more cloud computing systems via one or more APIs;
determining types of services for the one or more services based on usage and performance data obtained from the one or more APIs;
determining states of one or more computing resources corresponding to the one or more services based on the types of services and performance parameters obtained from the one or more APIs; and
cataloging cloud inefficiencies of the one or more services using one or more cloud wastage templates based on the states of one or more computing resources, wherein the one or more cloud wastage templates follow conventions of a domain specific language (DSL) that describe the one or more cloud computing systems.

* * * * *